(12) United States Patent
Goto et al.

(10) Patent No.: US 10,512,069 B2
(45) Date of Patent: Dec. 17, 2019

(54) TERMINAL DEVICE AND BASE STATION DEVICE

(71) Applicant: SHARP KABUSHIKI KAISHA, Sakai, Osaka (JP)

(72) Inventors: Jungo Goto, Sakai (JP); Osamu Nakamura, Sakai (JP); Yasuhiro Hamaguchi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/568,412

(22) PCT Filed: Apr. 14, 2016

(86) PCT No.: PCT/JP2016/061982
§ 371 (c)(1),
(2) Date: Oct. 20, 2017

(87) PCT Pub. No.: WO2016/171062
PCT Pub. Date: Oct. 27, 2016

(65) Prior Publication Data
US 2018/0160401 A1    Jun. 7, 2018

(30) Foreign Application Priority Data

Apr. 20, 2015 (JP) .................................. 2015-085541

(51) Int. Cl.
*H04W 72/08* (2009.01)
*H04W 72/04* (2009.01)
(Continued)

(52) U.S. Cl.
CPC ....... *H04W 72/042* (2013.01); *H04J 11/0036* (2013.01); *H04L 1/0048* (2013.01);
(Continued)

(58) Field of Classification Search
None
See application file for complete search history.

(56) References Cited

U.S. PATENT DOCUMENTS 9,357,504 B2    5/2016  Ohwatari et al.
9,642,150 B2    5/2017  Sagae et al.
(Continued)

FOREIGN PATENT DOCUMENTS

JP    2014-131239 A    7/2014
WO    2014/017155 A1   1/2014

OTHER PUBLICATIONS

Media Tek Ink,"New SI Proposal:Study on Downlink Multiuser Superposition Transmission for LTE," RP-150496, 3GPP TSG RAN Meeting #67 Shanghai, China, Mar. 9-12, 2015.
(Continued)

*Primary Examiner* — Brandon M Renner
(74) *Attorney, Agent, or Firm* — ScienBiziP, P.C.

(57) ABSTRACT

In a base station device for transmitting data signals to a plurality of terminal devices, the base station device includes a signal multiplexing unit that multiplexes data signals for at least a first terminal device and a second terminal device, a control information generation unit that generates, for the first terminal device, control information containing information related to the data signal destined for the second terminal device, and a radio receiving unit that receives information of a reception processing capability of each terminal device. The information of the reception processing capability is information indicating whether the terminal device executes error correction decoding of an interference signal when the terminal device detects the multiplexed data signals, and the information related to the data signal destined for the second terminal device and contained in the control information is generated by the control information generation unit to be different depending on the received information of the reception processing capability.

8 Claims, 13 Drawing Sheets

(51) Int. Cl.
  H04L 5/00 (2006.01)
  H04J 11/00 (2006.01)
  H04L 1/00 (2006.01)
  H04B 1/10 (2006.01)
  H04B 1/40 (2015.01)

(52) U.S. Cl.
  CPC .......... H04L 5/0037 (2013.01); H04L 5/0053 (2013.01); H04W 72/082 (2013.01); *H04B 1/10* (2013.01); *H04B 1/40* (2013.01); *H04W 72/048* (2013.01)

(56) References Cited

U.S. PATENT DOCUMENTS

| | | | | |
|---|---|---|---|---|
| 2014/0362958 | A1* | 12/2014 | Choi | H04L 25/03006 |
| | | | | 375/348 |
| 2015/0146638 | A1 | 5/2015 | Ohwatari et al. | |
| 2015/0351104 | A1 | 12/2015 | Sagae et al. | |
| 2015/0358064 | A1* | 12/2015 | Benjebbour | H04B 7/0452 |
| | | | | 370/329 |
| 2015/0358971 | A1* | 12/2015 | Soriaga | H04L 1/0057 |
| | | | | 370/329 |
| 2016/0065401 | A1* | 3/2016 | Jia | H04L 5/02 |
| | | | | 375/298 |
| 2016/0205695 | A1* | 7/2016 | Kishiyama | H04W 72/082 |
| | | | | 370/315 |
| 2017/0034812 | A1* | 2/2017 | Deng | H04W 72/046 |
| 2017/0331577 | A1* | 11/2017 | Parkvall | H04J 11/0079 |
| 2019/0081753 | A1* | 3/2019 | Jung | H04B 7/0617 |

OTHER PUBLICATIONS

Osamu Nakamura et al.,"Frequency Selection Diversity Effect for Downlink Non-orthogonal Multiple Access with Maximum Likelihood Detection",IEICE Techninal Report,Jan. 15, 2015(Jan. 15, 2015),vol. 144,No. 395,pp. 91 to 96.

* cited by examiner

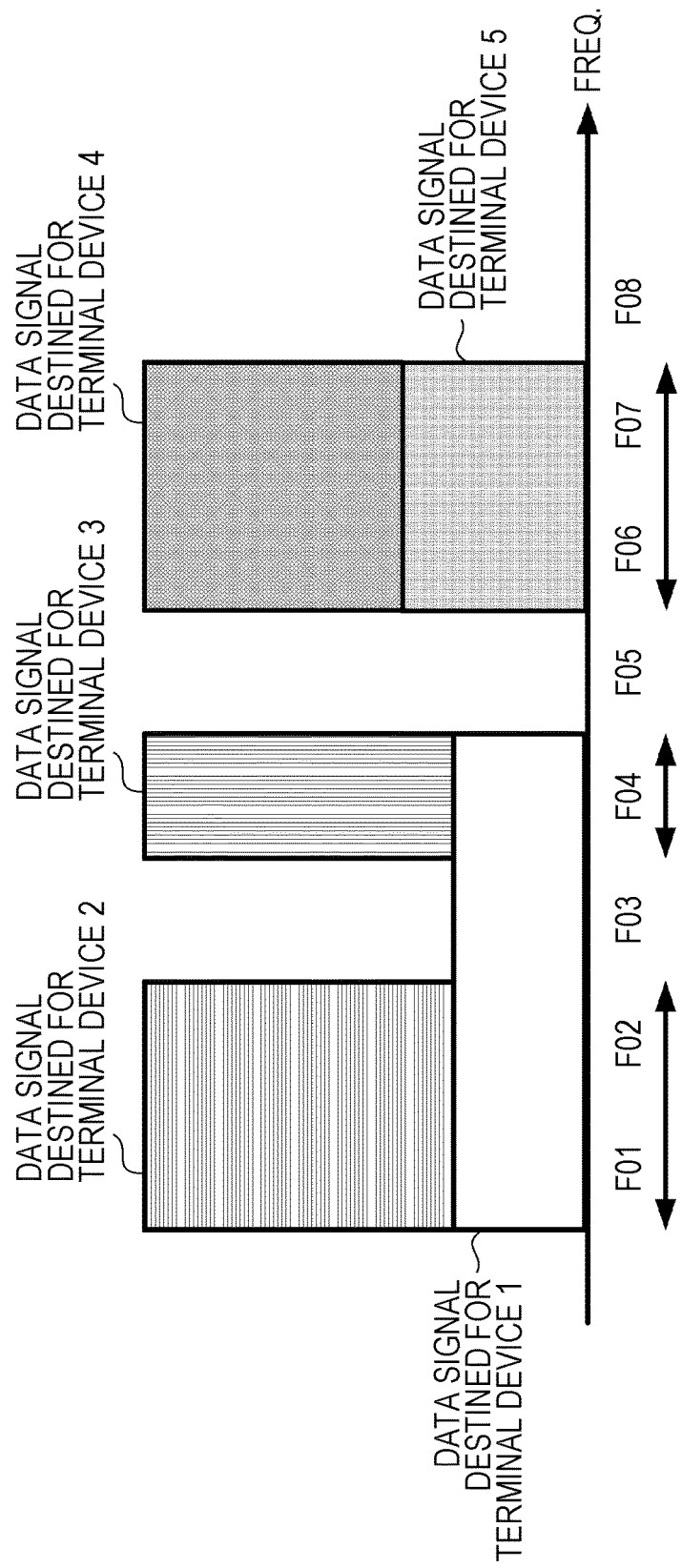

TERMINAL DEVICE AND BASE STATION DEVICE

TECHNICAL FIELD

The present invention relates to a terminal device and a base station device.

BACKGROUND ART

In a mobile communication system, while a system band is further broadened with a rapid increase of traffic, there are issues one of which is to increase spectrum efficiency, i.e., efficiency in use of frequency spectra that are limited resources. In communication systems, such as LTE (Long Term Evolution) and LTE-A (LTE-Advanced), in accordance with 3GPP (Third Generation Partnership Project), standardization has recently been progressed on the premise of FDMA (Frequency Division Multiple Access), which is one of access techniques to avoid interference among terminal devices (also called intra-user interference) in communications between a base station device (such as a base station, a transmitting station, a transmitting point, a downlink transmitting device, an uplink receiving device, a transmit antenna group, a transmit antenna port group, or eNodeB) and a plurality of terminal devices by usually keeping orthogonality among the terminal devices.

In 3GPP LTE Rel. 8, for example, OFDM (Orthogonal Frequency Division Multiplexing) is used in a down line (communication from a base station device to a terminal device), and DFT-S-OFDM (Discrete Fourier Transform Spread OFDM) is specified for an up line (communication from the terminal device to the base station device).

Recently, NOMA (Non-Orthogonal Multiple Access) techniques of allocating the same time, frequency and spatial resources (precoding in the same space) to a plurality of terminal devices and transmitting signals in a non-orthogonally multiplexed state have been studied with intent to increase a system capacity and to improve communication opportunities (see Non Patent Literature (NPL) 1). In NOMA, inter-user interference generates because the signals to be sent from the base station device to the plurality of terminal devices are transmitted in the non-orthogonally multiplexed state by Superposition Coding (SC, also called SCM: Superposition Coded Modulation), for example. Accordingly, the terminal device is needed to cancel or suppress the inter-user interference. As techniques for cancelling the inter-user interference, there are, for example, CWIC (Codeword Level Interference Cancellation) that removes the interference by employing a decoding result of an interference signal, and SLIC (Symbol Level Interference Cancellation) that removes the interference by employing an interference signal before decoding. MLD (Maximum Likelihood Detection) can also be applied as a signal detection method in NOMA.

CITATION LIST

Non Patent Literature

NPL 1: Media Tek Ink, "New SI Proposal: Study on Downlink Multiuser Superposition Transmission for LTE," RP-150496, 3GPP, March 2015

SUMMARY OF INVENTION

Technical Problem

In trying to realize NOMA with SC, the non-orthogonally multiplexed terminal devices need MCS information of an interference signal to detect the interference signal in a receiving process of CWIC or SLIC. When the terminal device uses CWIC, the base station device needs frequency resource information (Resource Allocation Information or Resource Assignment Information), which is allocated to the terminal device as a symbol formed by one code word, in order to perform error correction decoding of the interference signal. In addition, when a distribution ratio of transmission power (i.e., a power ratio) is changed depending on combination (pairing) of the non-orthogonally multiplexed terminal devices, the base station device is required to notify the power ratio to the terminal devices. However, if the base station device notifies, as downlink control information, all items of the above-mentioned information to the non-orthogonally multiplexed terminal devices for each of communication opportunities, a problem arises in that an overhead size increases with an increase in amount of control information. Another problem is that, when frequency resources are allocated to the non-orthogonally multiplexed terminal devices and those multiplexed terminal devices are different depending on the allocated frequency resources, the amount of information to be notified, including MCS, information of frequency resource allocation (RA), and the power ratio, increases depending on the number of interference signals to be detected.

In consideration of the above-described situations, the present invention provides a communication method capable of suppressing an increase in amount of control information in NOMA.

Solution to Problem (1) To solve the above-described problems, according to one aspect of the present invention, there is provided a base station device for transmitting data signals to a plurality of terminal devices, the base station device including a signal multiplexing unit that multiplexes data signals for at least a first terminal device and a second terminal device, a control information generation unit that generates, for the first terminal device, control information containing information related to the data signal destined for the second terminal device, and a radio receiving unit that receives information of a reception processing capability of each terminal device, wherein the information of the reception processing capability is information indicating whether the terminal device executes error correction decoding of an interference signal when the terminal device detects the multiplexed data signals, and the information related to the data signal destined for the second terminal device and contained in the control information is generated by the control information generation unit to be different depending on the received information of the reception processing capability.

(2) According to one aspect of the present invention, the control information generation unit generates resource allocation information, a modulation order, and a coding rate of the interference signal as the information related to the data signal destined for the second terminal device and contained in the control information that is transmitted to the first terminal device executing the error correction decoding of the interference signal.

(3) According to one aspect of the present invention, the control information generation unit generates a modulation order of the interference signal as the information related to the data signal destined for the second terminal device and contained in the control information that is transmitted to the first terminal device not executing the error correction decoding of the interference signal.

(4) According to one aspect of the present invention, the control information generation unit generates a modulation order per sub-band of the interference signal as the information related to the data signal destined for the second terminal device and contained in the control information that is transmitted to the first terminal device not executing the error correction decoding of the interference signal.

(5) According to one aspect of the present invention, the control information generation unit generates transmission power per sub-band of the interference signal as the information related to the data signal destined for the second terminal device and contained in the control information that is transmitted to the first terminal device not executing the error correction decoding of the interference signal.

(6) According to one aspect of the present invention, the control information generation unit generates the control information, which is transmitted to the first terminal device, in different numbers of bits depending on the information of the reception processing capability, the information indicating whether the error correction decoding of the interference signal is executed.

(7) According to one aspect of the present invention, the base station device multiplexes the data signals destined for the plurality of terminal devices by Superposition Coding, and transmits the multiplexed data signals.

(8) According to one aspect of the present invention, the control information generation unit generates, on the basis of the information of the reception processing capability, the control information containing, as additional information, resource allocation information, a modulation order, and a coding rate for each of a predetermined number of interference signals.

(9) According to one aspect of the present invention, in the base station device, the signal multiplexing unit multiplexes the data signal destined for the first terminal device and the signals destined for the other plurality of terminal devices by Superposition Coding, and the predetermined number of interference signals contained in the control information generated by the control information generation unit are given by the data signal for the first terminal device and one of the signals multiplexed by Superposition Coding, the one occupying a relatively large number of frequency resources.

(10) According to one aspect of the present invention, in the base station device, the signal multiplexing unit multiplexes the data signal destined for the first terminal device and the signals destined for the other plurality of terminal devices by Superposition Coding, and the predetermined number of interference signals contained in the control information generated by the control information generation unit are given by the data signal for the first terminal device and one of the signals multiplexed by Superposition Coding, the one having relatively small transmission power.

(11) According to one aspect of the present invention, in the base station device, the signal multiplexing unit multiplexes the data signal destined for the first terminal device and the signals destined for the other plurality of terminal devices by Superposition Coding, and the predetermined number of interference signals contained in the control information generated by the control information generation unit are given by the data signal for the first terminal device and one of the signals multiplexed by Superposition Coding, the one having a relatively high modulation order.

(12) According to one aspect of the present invention, in the base station device, the signal multiplexing unit multiplexes the data signal destined for the first terminal device and the signals destined for the other plurality of terminal devices by Superposition Coding, and the predetermined number of interference signals contained in the control information generated by the control information generation unit are given by the data signal for the first terminal device and one of the signals multiplexed by Superposition Coding, the one having a relatively low coding rate.

(13) According to one aspect of the present invention, there is further provided a terminal device for receiving signals transmitted from a base station device, the signals being resulted by multiplexing data signals for a plurality of terminal devices, the terminal device including a signal detection unit that detects a desired signal from the signals including the desired signal multiplexed with the data signals destined for the other terminal devices by Superposition Coding, a control information transmitting unit that transmits information of a reception processing capability, the information indicating whether the terminal device executes error correction decoding of an interference signal in a case of detecting the desired signal by the signal detection unit, and a control information detection unit that detects control information containing a transmission parameter of the desired signal and information related to the data signals destined for the other terminal devices, the control information being transmitted from the base station device, wherein the control information detection unit detects the control information having a different number of bits by blind decoding in accordance with the information of the reception processing capability transmitted to the base station device.

(14) According to one aspect of the present invention, there is still further provided a terminal device for receiving signals transmitted from a base station device, the signals being resulted by multiplexing data signals for a plurality of terminal devices, the terminal device including a signal detection unit that detects a desired signal from the signals including the desired signal multiplexed with the data signals destined for the other terminal devices by Superposition Coding, and a control information detection unit that detects control information containing a transmission parameter of the desired signal and information related to the data signals destined for the other terminal devices, the control information being transmitted from the base station device, wherein the information related to the data signals destined for the other terminal devices and detected by the control information detection unit contains resource allocation information, a modulation order, and a coding rate for each of a predetermined number of interference signals, and contains a modulation order for each of other interference signals, and the signal detection unit removes interference by employing information after the error correction decoding, the interference being caused by the interference signals for each of which the resource allocation information, the modulation order, and the coding rate have been notified, and removes interference by employing information after demodulation, the interference being caused by the interference signals for each of which the modulation order has been notified.

Advantageous Effects of Invention

According to the present invention, an increase in amount of control information in NOMA can be suppressed.

BRIEF DESCRIPTION OF DRAWINGS

FIG. 13 illustrates an example of the frequency resource allocation to a plurality of terminal devices according to the present invention.

DESCRIPTION OF EMBODIMENTS

An embodiment will be described below with reference to the drawings. In the following embodiment, a communication system includes a base station device (e.g., a transmitting device, a cell, a transmitting point, a transmit antenna group, a transmit antenna port group, a component carrier, a serving cell, eNodeB, Pico eNodeB, a small cell, RRH: Radio Remote Head, or LPN: Low Power Node), and a terminal device (e.g., a terminal, a mobile terminal, a receiving point, a receiving terminal, a receiving device, a receive antenna group, a receive antenna port group, or UE: User Equipment). This Description is made on the premise of a down line (communication from the base station device to the terminal device, called a downlink hereinafter). However, a method of suppressing an increase of control information according to the present invention may be applied to control information for data transfer via an up line (communication from the terminal device to the base station device, called an uplink hereinafter). The present invention may be applied to not only transmission of control information between the base station device and the terminal device, but also to transmission of control information between the base station device and a relay station device, control information between the relay station device and the terminal device, and control information for transmission between the terminal devices. While the present invention is described in connection with an example in which the base station device transmits data signals destined for a plurality of terminal devices in a state multiplexed by SC, the present invention is not limited to such an example and may be applied to control information used to remove inter-cell interference, or control information used in single-user MIMO or multi-user MIMO.

Figure 1:
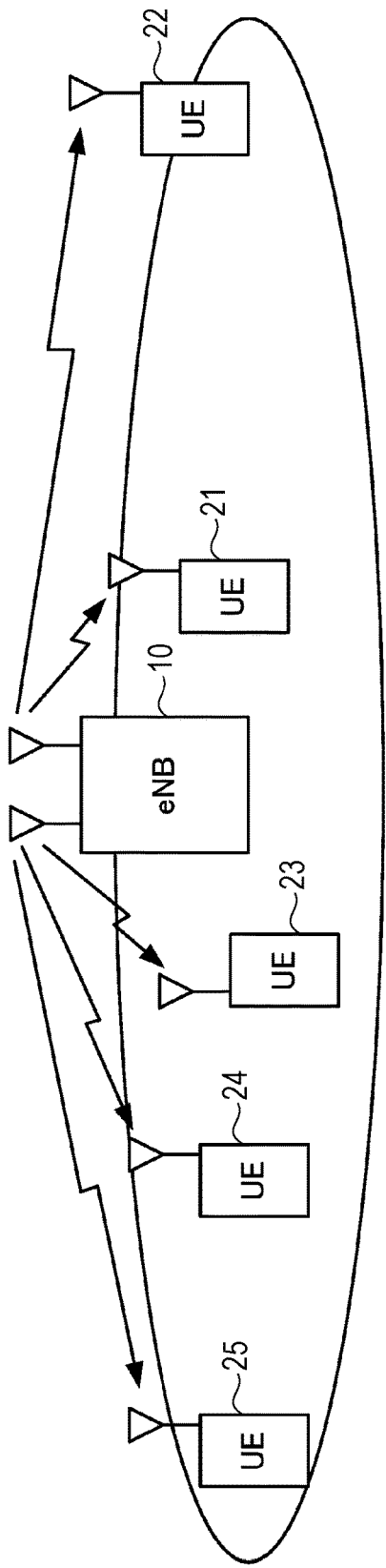
FIG. 1 illustrates an example of configuration of a system according to the present invention.

FIG. 1 illustrates an example of configuration of a system according to the present invention. The system is constituted by a base station device 10 and terminal devices 21 to 25. The number of terminal devices is not limited to the number in the illustrated example, and the number of antennas in each terminal device may be one or plural. The base station device 10 may perform communication using the so-called licensed band for which a license is permitted in a country or a district where a wireless business operator provides services, or may perform communication using the so-called unlicensed band for which a license from a country or a district is not required. The base station device 10 may be a macro base station device having a wide coverage, or a pico base station device (also called PicoeNB; evolved Node B, SmallCell, Low Power Node, or Remote Radio Head), which has a coverage narrower than that of the macro base station device. In this Description, a frequency band other than the licensed band is not limited to the unlicensed band as one example, and may be a white band (white space) as an alternate example. The base station device 10 may utilize CA (Carrier Aggregation) techniques using a plurality of Component Carriers (CC's), also called Serving Cells, in the band that is employed in LTE communication.

The base station device 10 transmits a downlink data signal via PDSCH (Physical Downlink Shared CHannel), and control information containing a transmission parameter, which is used in the data signal, via PDCCH (Physical Downlink Control CHannel) or EPDCCH (Enhanced PDCCH). Each of the terminal devices 21 to 25 detects DCI (Downlink Control Information, also called DL grant) in the control information, which is notified via PDCCH or EPDCCH, by blind decoding, and performs detection of the downlink data signal on the basis of the transmission parameter contained in DCI. In the uplink, each of the terminal devices 21 to 25 detects DCI (also called UL grant when an uplink transmission parameter is notified) in the control information, which is transmitted from the base station device 10 via PDCCH or EPDCCH, by blind decoding, and performs uplink data transfer on the basis of the transmission parameter contained in DCI. Uplink data is transmitted via PUSCH (Physical Uplink Shared CHannel), and uplink control information, such as SR (Scheduling Request), ACK/NACK (Acknowledgement/Negative Acknowledgement) for downlink data, and CSI (Channel State Information), is transmitted via PUCCH (Physical Uplink Control CHannel).

The base station device 10 determines frequency resources, which are used in the downlink data transfer to the individual terminal devices, on the basis of frequency scheduling. The base station device 10 selects, on the basis of the frequency scheduling, data transfer using OFDM in some cases, and data transfer using NOMA (Non-Orthogonal Multiple Access) with Superposition Coding (SC, also called SCM: Superposition Coded Modulation) by utilizing a reception power difference (path loss difference) between the terminal devices in some other cases. In the case of non-orthogonal multiplexing by SC, because transmission power used in the downlink data transfer is allocated to users multiplexed by SC, the transmission power is different from that in ordinary OFDM transfer in which signals for the plurality of terminal devices are not multiplexed by SC. Moreover, because the terminal device performs detection after removing or suppressing the inter-user interference resulted from the multiplexing by SC, the base station device is required to notify control information necessary for detection of an interference signal. For example, when the base station device multiplexes the terminal devices 21 and 22 by SC, there may be a case where power allocated to the terminal device 21 having a smaller path loss is set to be smaller than that allocated to the terminal device 22 having a larger path loss. In such a case, a signal destined for the terminal device 22 to which larger power is allocated becomes an interference signal with respect to the terminal device 21, and it is difficult for the terminal device 21 to detect a desired signal unless the interference signal with larger power is suppressed or removed. In a related-art system, however, each terminal device does not detect signals destined for the other terminal devices. Thus, in order to realize the NOMA transfer, the base station device is required to notify control information to the terminal device, which is going to suppress or remove the interference signal, the control information being used to detect a signal interfering with the relevant terminal device and destined for the other terminal device. In view of the above-described situation, a method of realizing the NOMA transfer without significantly increasing the amount of control information is described in the following embodiment.

(First Embodiment)

Figure 2:
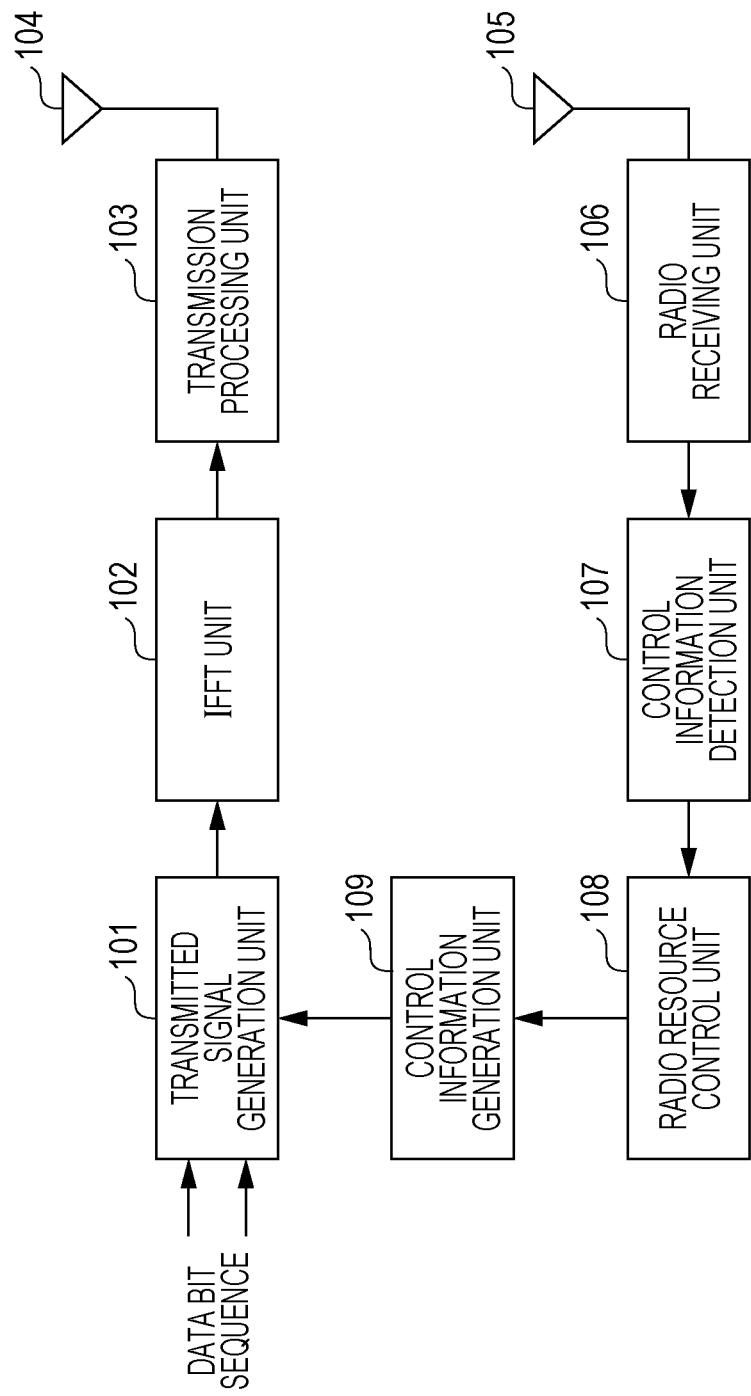
FIG. 2 illustrates an example of configuration of a base station device according to the present invention.

FIG. 2 illustrates an example of configuration of the base station device according to the present invention. It is to be noted that FIG. 2 illustrates the least necessary blocks to implement the present invention. For simplicity of explanation, the base station device includes one transmit antenna and one receive antenna in the example of FIG. 2. The base station device receives, at a receive antenna 105, a signal transmitted from the terminal device via PUCCH or PUSCH, and inputs the received signal to a radio receiving unit 106. The radio receiving unit 106 down-converts the received signal to a base band frequency, executes A/D (Analog/Digital) conversion, and inputs a signal, which is obtained by removing CP (Cyclic Prefix) from a resulted digital signal, to a control information detection unit 107. The control information detection unit 107 detects, from the received signal, control information transmitted via PUCCH and control information, such as PH (Power Headroom), transmitted via PUSCH, and inputs the detected control information to a radio resource control unit 108. Here, information regarding a reception processing capability of the terminal device is received as the uplink control information. The information regarding the reception processing capability may be received as control information in a higher layer, such as a PDCP (Packet Data Convergence Protocol) layer, a RLC (Radio Link Control) layer, or a RRC (Radio Resource Control) layer. Alternatively, the information regarding the reception processing capability may be notified as information regarding FGI (Feature Group Indicator) or UE capability, for example. Other examples of the information regarding the reception processing capability may be information indicating whether CWIC (Codeword Level Interference Cancellation) using a result of error correction decoding of the interference signal can be applied, information indicating whether SLIC (Symbol Level Interference Cancellation) or MLD (Maximum Likelihood Detection) using a demodulation result without performing error correction decoding of the interference signal can be applied, information indicating whether SIC (Successive Interference Canceller) with CWIC or SLIC, for example, can be applied, information indicating whether PIC (Parallel Interference Canceller) can be applied, and information indicating whether turbo equalization with repeated processing can be applied. The radio resource control unit 108 determines, as the frequency scheduling, allocation of frequency resources, which are used in the downlink data transfer, on the basis of CSI, etc. While allocation of the frequency resources is described on the premise that the allocation is performed in units of RB (Resource Block) constituted by 12 sub-carriers of 1 sub-frame, or in units of RBG (Resource Block Group) constituted by grouping a plurality of RB's, the present invention is not limited to that example. In an example described here, 1 sub-frame is constituted by 2 slots, and 1 slot is constituted by 7 OFDM symbols. However, a sub-frame configuration usable in the present invention is also not limited to such an example. The radio resource control unit 108 determines, in the frequency scheduling, not only combination of terminal devices that are not multiplexed by SC and transferred with OFDM, and terminal devices that are multiplexed by SC, but also Resource Allocation or Resource Assignment (RA: called RA information hereinafter). For the terminal devices that are multiplexed by SC, the radio resource control unit 108 determines transmission power that is allocated to each of the terminal devices. Furthermore, the radio resource control unit 108 determines, by Adaptive Modulation and Coding (also called link adaptation), whether to employ MCS (Modulation and Coding Scheme) or MIMO (Multiple Input Multiple Output) transfer of data destined for each terminal device. In the case of the MIMO transfer, the radio resource control unit 108 determines the number of streams (or the number of transmission layers). The radio resource control unit 108 inputs information regarding RA, MCS, and the number of transmission streams to a control information generation unit 109.

The control information generation unit 109 adds the input control information to setting of TM (Transmission Mode) and RRC (Radio Resource Control) for the downlink to each terminal, and generates control information corresponding to a DCI format that is determined depending on the reception processing capability received from the terminal device. The DCI format is specified as a plurality of formats depending uses. For example, DCI format 1 or 1A for a single antenna and DCI format 2C for MU-MIMO are defined with respect to the downlink. DCI format 0 for a single antenna and DCI format 4 for MIMO are defined with respect to the uplink. The control information generation unit 109 inputs the generated control information to a transmitted signal generation unit 101 for generating downlink data and notifying the downlink data to the terminal device. Here, the base station device notifies control information (additional information) needed to remove or suppress the interference signal to the terminal devices, which are multiplexed by SC, by employing the DCI format used in the transmission mode of the NOMA transfer. However, the present invention may be applied to the existing transmission mode. In other words, the present invention may be implemented by making setting with RRC, for example, to add information of the interference signal, which is needed in reception processing of the NOMA transfer.

The additional information used in the present invention is different depending on whether decoding of an interference signal, such as CWIC, is performed. The base station device transmits, to the terminal device with an interference-signal decoding capability such as represented by CWIC, the RA information and the MCS information for the predetermined number of interference signals in a state contained in DCI. For example, the base station device transmits the RA information and the MCS information of one interference signal. This is because the decoding of the interference signal is difficult for the terminal device to execute unless there are information regarding to which one of frequency resources a signal constituting one code word is allocated, and information regarding a coding rate. Among frequency resources used by the base station device for the data transfer to the terminal device with the interference-signal decoding capability such as represented by CWIC, some interference signals may exist in some frequency resources that are not designated in the RA information of the interference signals. Therefore, the base station device may, instead of notifying the RA information, notify a modulation order or MCS for each of other interference signals multiplexed in frequency resources that are not designated in the RA information of the interference signals. On the other hand, the terminal device, which performs reception processing without decoding interference signals, such as SLIC or MLD, to remove or suppress the interference, is just needed to recognize a modulation order of each interference signal, and it is not needed to receive the RA information and the coding rate information. Accordingly, the base station device notifies only the information of the modulation order of the interference signal to the terminal device that performs the reception processing, such as SLIC or MLD. As an alternative, the terminal device performing the reception processing, such as SLIC or MLD, may estimate the modulation order of the interference signal. Thus, the base station device employs different DCI formats or transmits different kinds of control information having different sizes (bit numbers) depending on the reception processing capabilities of the terminal devices. The additional information used in the present invention may be added with information of transmission power that is applied to the data signal for each of the terminal devices multiplexed by SC.

Figure 3:
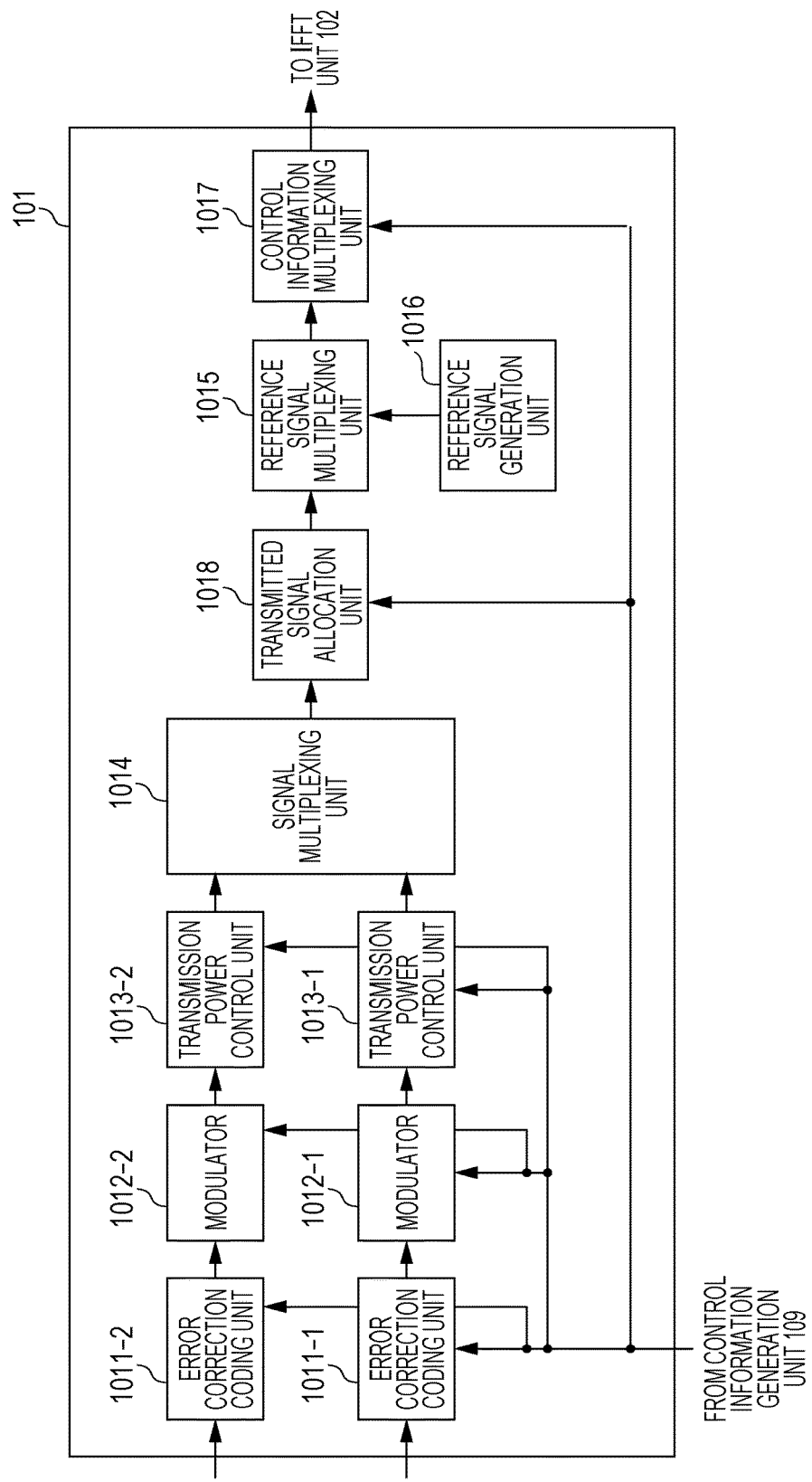
FIG. 3 illustrates an example of configuration of a transmitted signal generation unit 101 according to the present invention.

A data bit sequence to be transmitted to each terminal device is input to the transmitted signal generation unit 101. FIG. 3 illustrates an example of configuration of the transmitted signal generation unit 101 according to the present invention. As seen from FIG. 3, the input data bit sequence is input to error correction coding units 1011-1 to 1011-2. The error correction coding units 1011-1 to 1011-2 execute coding of error correction code on the input data bit sequence. For example, turbo code, LDPC (Low Density Parity Check) code, or convolutional code is used as the error correction code. The type of the error correction coding executed in each of the error correction coding units 1011-1 to 1011-2 may be previously determined for a set of a transmitter and receiver, or may be notified as control information per transmission/reception opportunity, or may be changed over using a parameter preset corresponding to the transmission mode and a parameter notified as the control information. Moreover, a coding rate of the error correction coding is input from the control information generation unit 109, and each of the error correction coding units 1011-1 to 1011-2 works out a coding rate, which is used in the down link data transfer, with puncturing (rate matching).

Modulators 1012-1 to 1012-2 receive information of a modulation scheme from the control information generation unit 109, and generate modulated symbol sequences by modulating respective coded bit sequences that have been input from the error correction coding units 1011-1 to 1011-2. Examples of the modulation scheme are QPSK (Quaternary Phase Shift Keying), 16QAM (16-ary Quadrature Amplitude Modulation), 64QAM, and 256QAM. The modulators 1012-1 to 1012-2 output the generated modulated symbol sequences to transmission power control units 1013-1 to 1013-2, respectively.

The transmission power control units 1013-1 to 1013-2 receive information of transmission power allocated to corresponding ones of the terminal devices, which are multiplexed by SC, from the control information generation unit 109, and execute transmission power control. A signal multiplexing unit 1014 receives signals for the terminal devices multiplexed by SC, and multiplexes those signals. As multiplexing methods by SC, there are a method of modulating the signals destined for the terminal devices in accordance with the Gray code, and adding the modulated signals as they are, and a method of adding the signals such that an array of signal points after the multiplexing by SC becomes the Gray code. Which one of the methods is to be used may be previously determined for a set of a transmitter and receiver, or may be notified as control information per transmission/reception opportunity, or may be changed over corresponding to the transmission mode or a parameter notified as the control information. A transmitted signal allocation unit 1018 receives a transmitted signal sequence from signal multiplexing unit 1014, and allocates the transmitted signal sequence to RB that is indicated by the RA information input from the control information generation unit 109.

A reference signal multiplexing unit 1015 receives the transmitted signal sequence from the transmitted signal allocation unit 1018 and a reference signal sequence from a reference signal generation unit 1016, and generates a frame of a transmitted signal by multiplexing those received signals. Here, a reference signal for the downlink includes CRS (Cell-Specific Reference Signal), URS (UE-Specific Reference Signal) related to PDSCH, DMRS (De-Modulation Reference Signal) related to EPDCCH, NZP CSI-RS (Non-Zero Power Channel State Information Reference Signal), ZPCSI-RS (Zero Power Channel State Information Reference Signal), and DRS (Discovery Reference Signal or Discovery signal). In this embodiment, the transmission power of the reference signal may be the same or different between the case of multiplexing a plurality of terminal devices by SC according to NOMA and the case of the OFDM transfer in which signals for a plurality of terminal devices are not multiplexed by SC. Thus, in the case of multiplexing data signals destined for a plurality of terminal devices by SC according to NOMA, respective transmission powers of data and the reference signal may be set the same or different when the transmission power is distributed to the data signals. When the transmission power is different at least between the data and the reference signal, the base station device is required to notify the transmission power as control information to the terminal device, or to notify the transmission power in a manner linked to other control information. A control information multiplexing unit 1017 multiplexes the signal sequence input from reference signal multiplexing unit 1015 and the control information of DCI, the latter being input from the control information generation unit 109, and inputs a resulting transmitted signal to an IFFT unit 102.

The IFFT unit 102 receives the frame of the transmitted signal in a frequency domain, and executes Inverse Fast Fourier Transform in units of OFDM symbol for conversion from a frequency-domain signal sequence to a time-domain signal sequence. The time-domain signal sequence is input to a transmission processing unit 103. The transmission processing unit 103 inserts CP into the signal sequence, converts the signal sequence to an analog signal through D/A (Digital/Analog) conversion, and up-converts a converted signal to a radio frequency used for transfer. Furthermore, the transmission processing unit 103 amplifies the up-converted signal by a PA (Power Amplifier), and transmits an amplified signal via a transmit antenna 104. In a manner described above, the base station device generates the signal destined for the terminal device.

Figure 4:
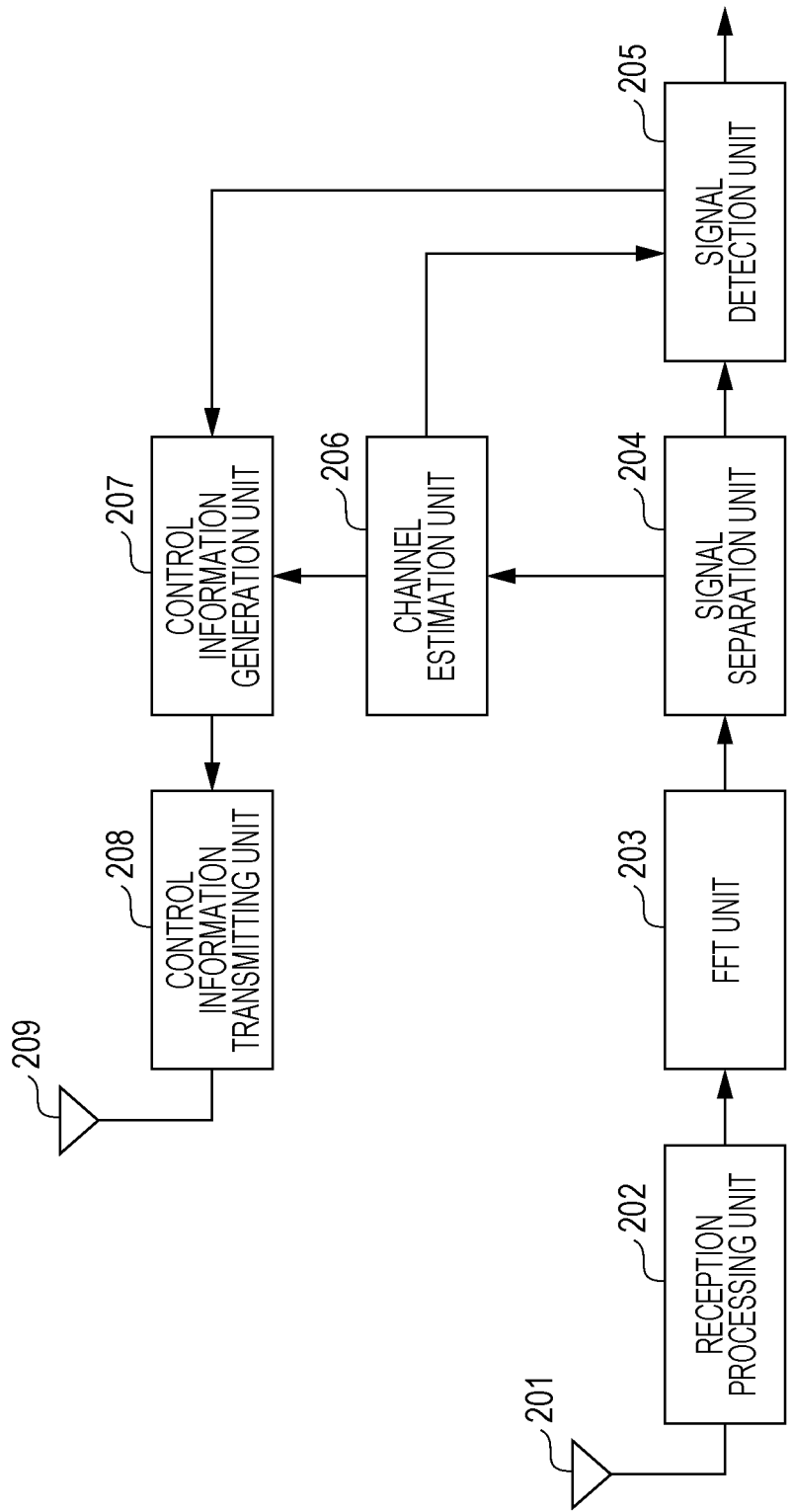
FIG. 4 illustrates an example of configuration of a terminal device according to the present invention.

FIG. 4 illustrates an example of configuration of a terminal device according to the present invention. It is to be noted that FIG. 4 illustrates the least necessary blocks to implement the present invention. For simplicity of explanation, the terminal device includes one transmit antenna and one receive antenna in the example of FIG. 4. The terminal device receives a signal transferred via a downlink at a receive antenna 201, and inputs the received signal to a reception processing unit 202. The reception processing unit 202 down-converts the received signal to a base band frequency, executes A/D conversion, and removes CP from a converted digital signal. The reception processing unit 202 outputs, to an FFT unit 203, a signal resulted after removing the CP. The FFT unit 203 executes Fast Fourier Transform of the input received signal sequence for conversion from a time-domain signal sequence to a frequency-domain signal sequence, and outputs the frequency-domain signal sequence to a signal separation unit 204.

Figure 5:
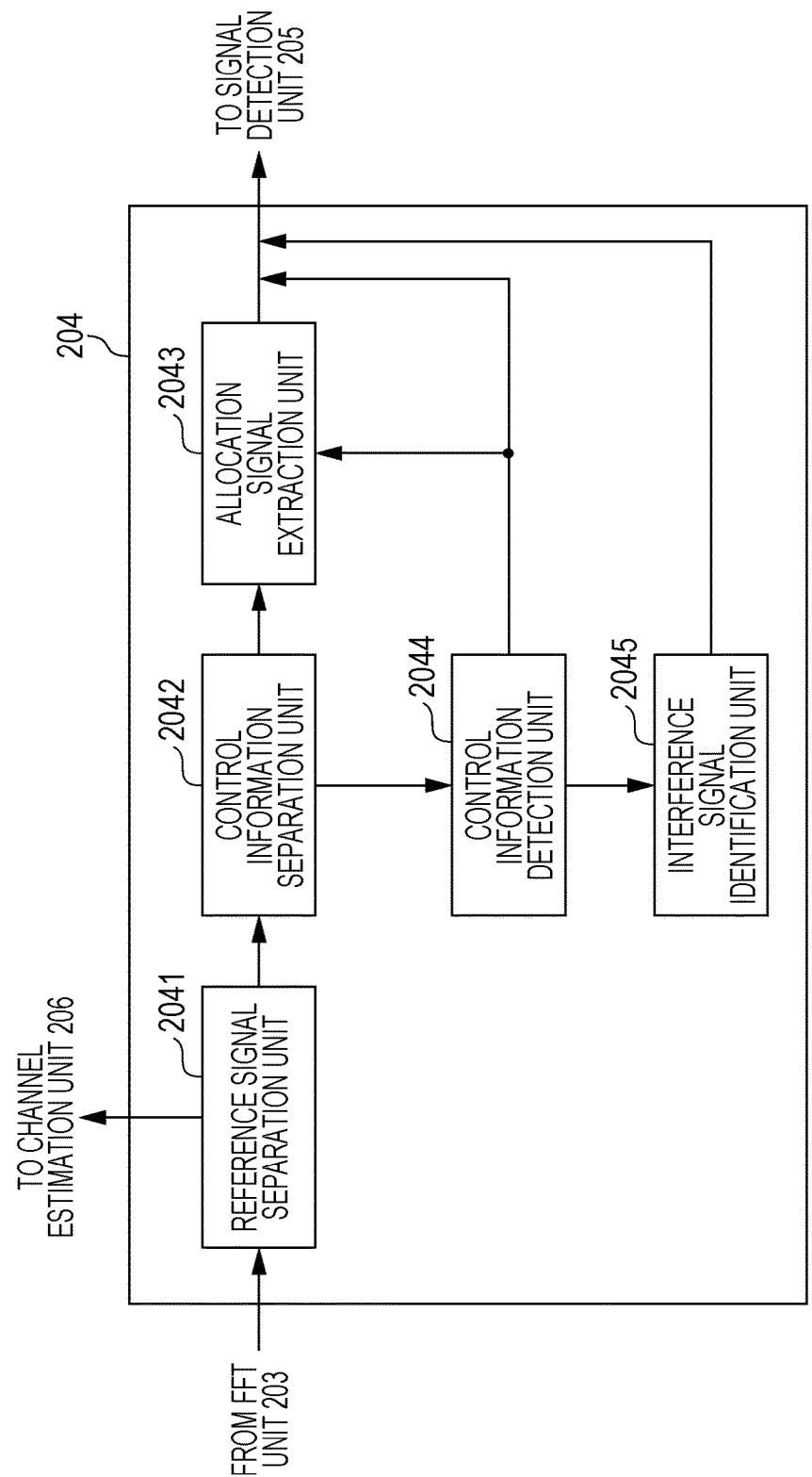
FIG. 5 illustrates an example of configuration of a signal separation unit 204 according to the present invention.

FIG. 5 illustrates an example of configuration of the signal separation unit 204 according to the present invention. As seen from FIG. 5, in the signal separation unit 204, the frequency-domain signal sequence input from the FFT unit 203 is input to a reference signal separation unit 2041. The reference signal separation unit 2041 separates the input signal into CRS, URS, DMRS, CSI-RS, DRS, etc. in the reference signal and the remaining signal, and outputs the former and latter signals after being separated to a channel estimation unit 206 and a control information separation unit 2042, respectively. The control information separation unit 2042 separates the input signal into a control signal transmitted via PDCCH, EPDCCH or PDSCH, and a data signal transmitted via PDSCH, and outputs the separated control and data signals to a control information detection unit 2044 and an allocation signal extraction unit 2043, respectively. The control information detection unit 2044 detects the control information by executing blind decoding of a DCI format, which is determined depending on a transmission mode or setting of RRC, in a CSS (Common SS) or USS (UE-specific SS) that is set in PDCCH or EPDCCH. When the control information is received with RRC signaling of control information in a higher layer via PDSCH, the control information detection unit 2044 detects the control information through the reception processing. The control information detection unit 2044 outputs a transmission parameter (information of RA and MCS) of the signal destined for the relevant terminal device to the signal detection unit 205. The terminal device with the interference-signal decoding capability such as represented by CWIC detects, from the control information, the RA information and the MCS information regarding the predetermined number of interference signals, and inputs the detected information to an interference signal identification unit 2045. When the above-mentioned type of terminal device detects information regarding the transmission power of the interference signal, etc., the detected information is also input to interference signal identification unit 2045. On the basis of the input control information, the interference signal identification unit 2045 identifies frequency resources for which the RA information and the MCS information are notified and the interference signal can be decoded, and frequency resources for which the interference signal cannot be decoded, and outputs resulting information to the signal detection unit 205. In the terminal device in which the reception processing is executed, such as represented by SLIC or MLD, without decoding the interference signal to remove or suppress the interference, because the RA information and the MCS information of the interference signal are not notified and the modulation order is notified, the interference signal identification unit 2045 executes nothing. On the other hand, the allocation signal extraction unit 2043 extracts the transmitted signal on the basis of the RA information that is contained in the transmission parameter of the signal destined for the relevant terminal device.

The channel estimation unit 206 receives the reference signal transmitted in a state multiplexed with the data signal, and outputs a frequency response, which is estimated for demodulation, to the signal detection unit 205. Herein, the terminal device receives, as the control information, the information of transmission powers (power ratio) allocated to the plurality of terminal devices that are multiplexed by SC, or it estimates that information from the reception power of the reference signal. In order to transmit CSI via PUCCH, the channel estimation unit 206 further inputs the estimated frequency response to a control information generation unit 207. The control information generation unit 207 operates as follows. The control information generation unit 207 generates control information in formats corresponding to items to be transmitted at transmission timing, such as SR, ACK/NACK, and CSI that are transmitted via PUCCH. A control information transmitting unit 208 inserts CP into the signal sequence, converts the signal sequence to an analog signal through D/A conversion, and up-converts a converted signal to a radio frequency used for transfer. Furthermore, the control information transmitting unit 208 amplifies the up-converted signal by a PA, and transmits an amplified signal via a transmit antenna 209.

Figure 6:
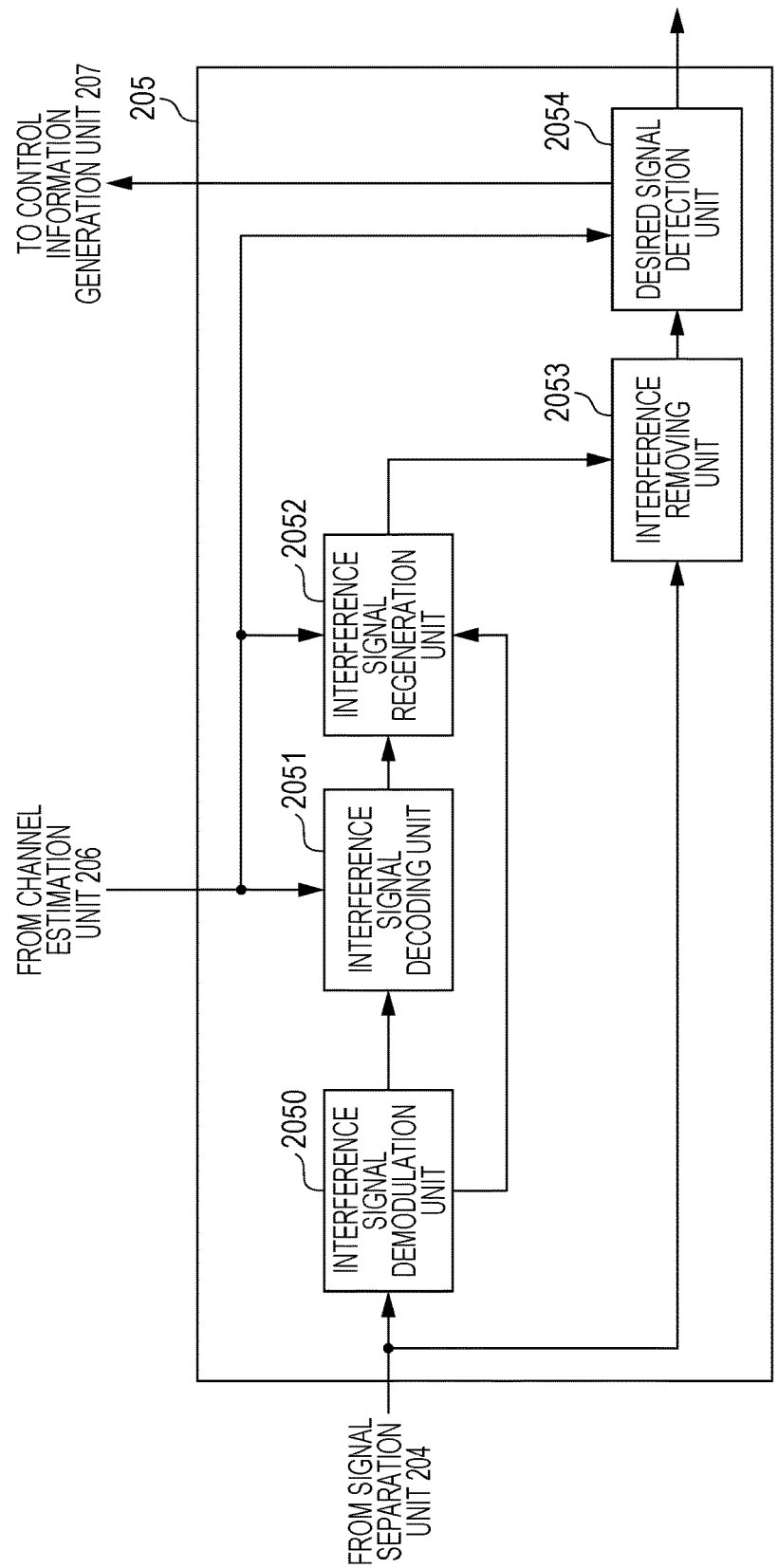
FIG. 6 illustrates an example of configuration of a signal detection unit 205 according to the present invention.

FIG. 6 illustrates an example of configuration of the signal detection unit 205 according to the present invention. In the signal detection unit 205, a transmission parameter of a signal destined for another terminal device, the signal interfering with the data signal sequence input from the signal separation unit 204, is input to an interference signal demodulation unit 2050, while the data signal sequence and a transmission parameter of the signal destined for the relevant terminal device are both input to an interference removing unit 2053. The interference signal demodulation unit 2050 demodulates the interference signal on the basis of both an estimated value of the frequency response corrected in accordance with the power ratio of the interference signal, which is input from the channel estimation unit 206, and the transmission parameter (such as the modulation order) input from the signal separation unit 204. The interference signal demodulation unit 2050 in the terminal device, which has the interference-signal decoding capability such as represented by CWIC, inputs not only demodulation results of frequency resources in which the interference signal can be decoded, the frequency resources being input from interference signal identification unit 2045, but also the information of the coding rate of the interference signal to an interference signal decoding unit 2051, and further inputs demodulation results of other frequency resources to an interference signal regeneration unit 2052. Here, the interference signal demodulation unit 2050 in the terminal device, which executes the reception processing without decoding the interference signal, such as SLIC or MLD, to remove or suppress the interference, inputs all demodulation results to the interference signal regeneration unit 2052. The interference signal decoding unit 2051 executes error correction decoding of the interference signal, and inputs a decoding result to interference signal regeneration unit 2052. The interference signal decoding unit 2051 executes the error correction decoding corresponding to the number of code words in the interference signal for which the error correction decoding can be performed, and receives, as the control information, the RA information for each code word. Here, the signals input to the interference signal regeneration unit 2052 from the interference signal demodulation unit 2050 and the interference signal decoding unit 2051 may be each a hard decision value or a Log Likelihood Ratio (LLR). The interference signal regeneration unit 2052 generates a replica of the interference signal from both a bit sequence or an LLR sequence of the detected interference signal and the estimated value of the frequency response, which has been corrected in accordance with the power ratio of the interference signal, and then outputs the replica to the interference removing unit 2053. The interference removing unit 2053 removes the interference by subtracting the replica of the interference signal from the data signal sequence, and inputs a signal sequence after removing the interference and the transmission parameter of the signal destined for the relevant terminal device to a desired signal detection unit 2054.

Figure 7:
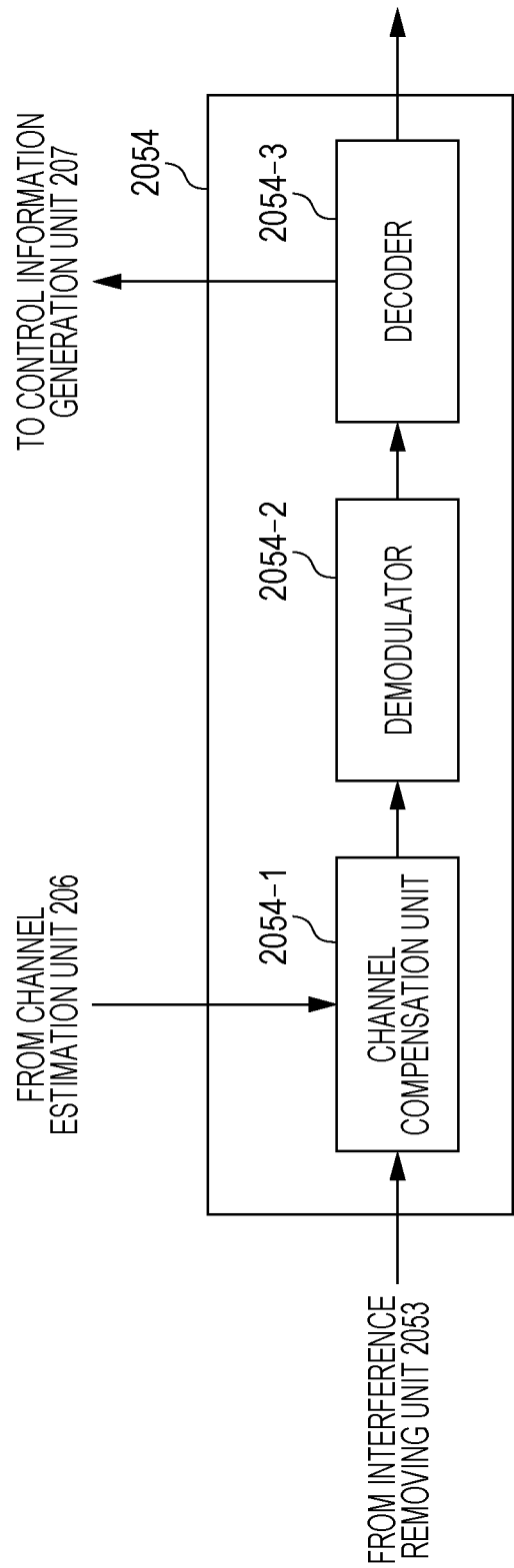
FIG. 7 illustrates an example of configuration of a desired signal detection unit 2054 according to the present invention.

FIG. 7 illustrates an example of configuration of the desired signal detection unit 2054 according to the present invention. The desired signal detection unit 2054 applies, to a channel compensation unit 2054-1, the signal sequence after removing the interference and the transmission parameter of the signal destined for the relevant terminal device, which are both input from the interference removing unit 2053, as well as the estimated value of the frequency response, which has been corrected in accordance with the power ratio of the desired signal and which has been input from channel estimation unit 206. The channel compensation unit 2054-1 executes processing to compensate for distortion of the radio channel on the signal sequence after removing the interference signal by employing the estimated value of the input frequency response. The channel compensation unit 2054-1 outputs the signal sequence after the channel compensation to a demodulator 2054-2. The demodulator 2054-2 receives information of the modulation scheme (i.e., the modulation order or whether signal addition is performed such that the signal after SP becomes the Gray code), the information being contained in the transmission parameter of the signal destined for the relevant terminal device, executes modulation processing on the signal sequence after the channel compensation, and obtains an LLR sequence in the form of a bit sequence. A decoder 2054-3 receives the information of the coding rate, which is contained in the transmission parameter of the signal destined for the relevant terminal device, and executes decoding processing on the LLR sequence. The decoder 2054-3 executes hard decision on the LLR sequence after the decoding, identifies the presence of an error bit with CRC (Cyclic Redundancy Check), and outputs information regarding the presence of an error bit to the control information generation unit 207. If there are no error bits, the decoder 2054-3 outputs the data bit sequence. While the above embodiment has been described in connection with the case where the desired signal detection unit 2054 employs SIC (Successive Interference Canceller) with CWIC or SLIC, for example, the present invention is not limited to that case. PIC (Parallel Interference Canceller), MLD (Maximum Likelihood Detection), or turbo equalization to execute repeated processing may also be used in another example.

Figure 8:
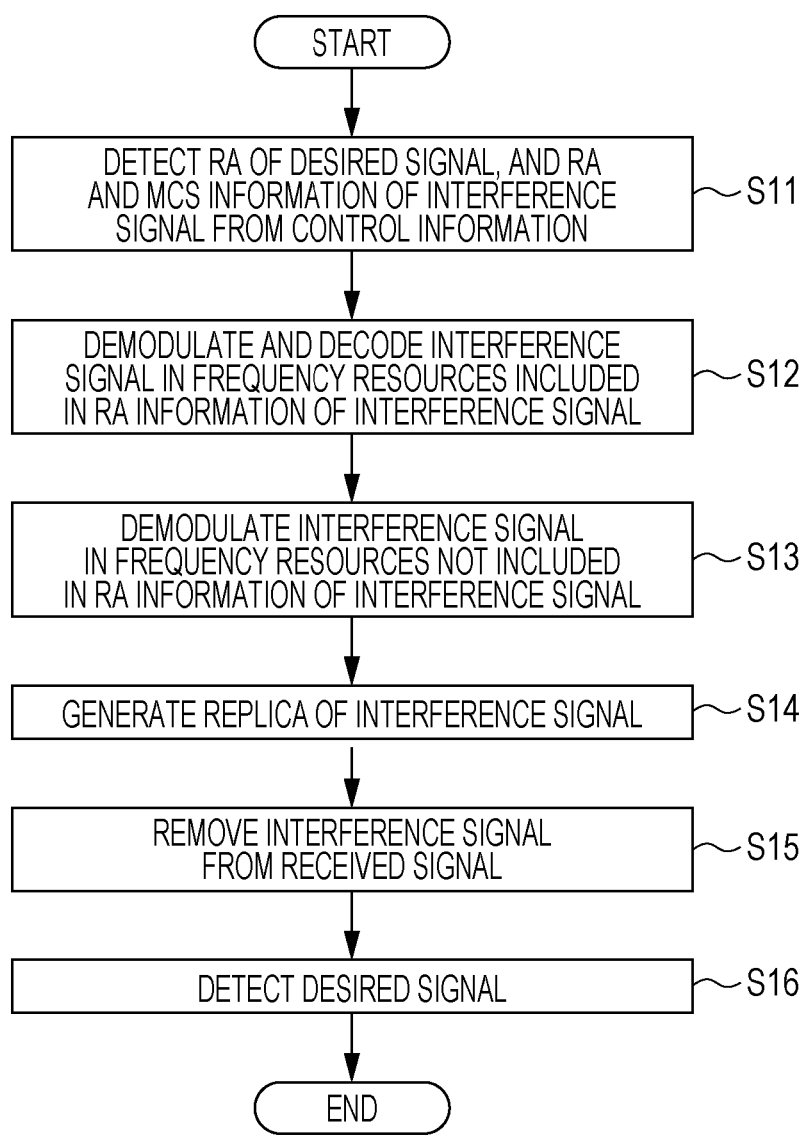
FIG. 8 illustrates an example of a flowchart of reception processing according to the present invention.
Figure 9:
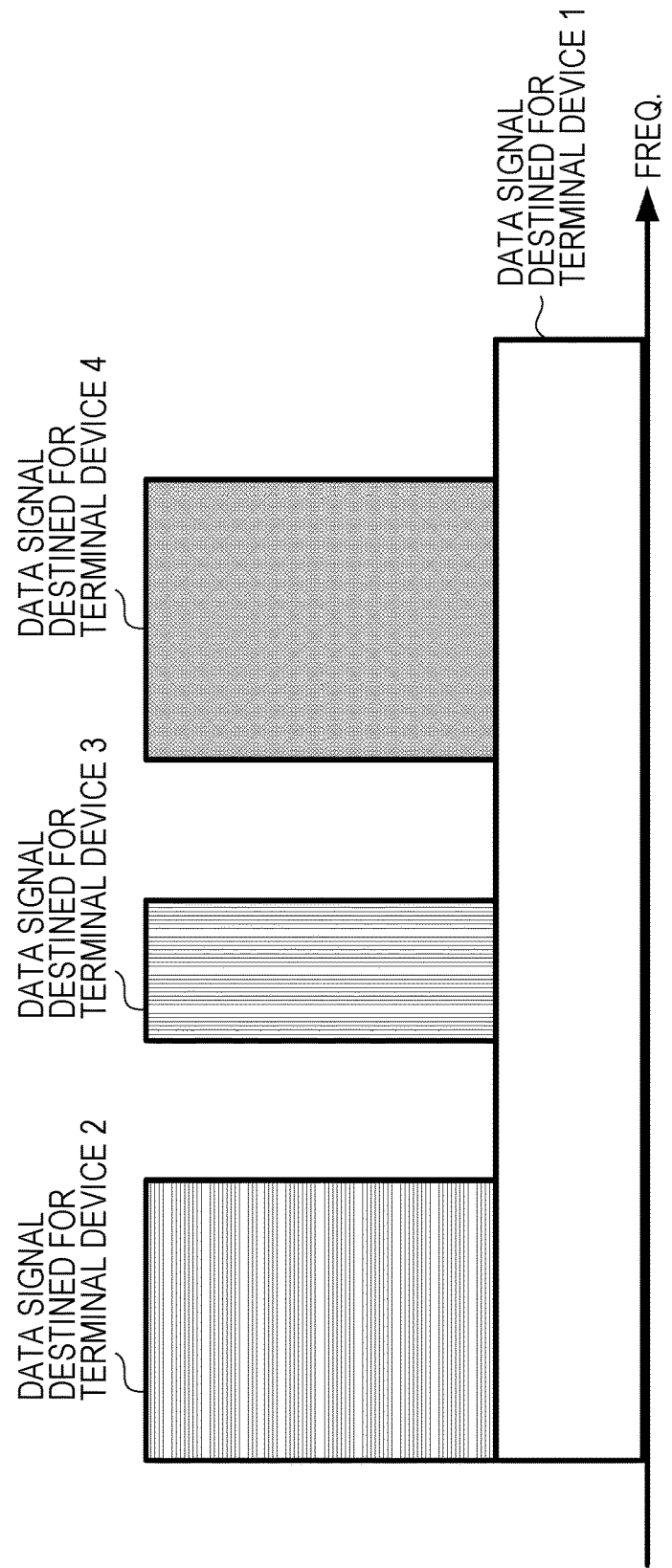
FIG. 9 illustrates one example of frequency resource allocation to a plurality of terminal devices according to the present invention.

FIG. 8 illustrates an example of a flowchart of the reception processing according to the present invention. First, the control information detection unit 2044 in the terminal device with the interference-signal decoding capability, such as represented by CWIC, detects the MCS information that is contained in the transmission parameter of the signal destined for the relevant terminal device, and both the RA information and the MCS information of one interference signal (S11). The number of interference signals for which the RA information and the MCS information are detected by the control information detection unit 2044 may not be one. The number of interference signals may be the predetermined number or the number notified in advance. For the frequency resources contained in the RA information of the interference signal, the terminal device executes the demodulation and the decoding in the interference signal demodulation unit 2050 and the interference signal decoding unit 2051, respectively (S12). Then, for frequency resources not contained in the RA information of the interference signal, the terminal device executes only the demodulation processing in the interference signal demodulation unit 2050 in accordance with the information of the modulation order (S13). FIG. 9 illustrates one example of frequency resource allocation to a plurality of terminal devices according to the present invention. A terminal device 1 in FIG. 9 has an interference-signal decoding capability such as represented by CWIC, and the base station device notifies, as the RA information and the MCS information of one interference signal, RA information and MCS information of a data signal destined for the terminal device 22. In that case, the terminal device 1 executes decoding of the data signal destined for the terminal device 2, and executes demodulation of data signals destined for terminal devices 3 and 4 because the RA information or the like is not notified for the terminal devices 3 and 4. In the interference signal detection regeneration unit 2052, the terminal device generates a replica of the interference signal (S14). The interference signal removing unit 2053 removes the interference by subtracting the replica of the interference signal from the data signal sequence (S15). The desired signal detection unit 2054 detects the desired signal by employing the notified transmission parameter (S16). Thus, the terminal device detects the desired signal in a state multiplexed by SC.

According to this embodiment, as described above, since the base station device notifies control information containing information, which is necessary for error correction decoding of the predetermined number of interference signals, to the terminal devices multiplexed by SC corresponding to respective reception processing capabilities of the terminal devices, an increase in amount of the control information can be suppressed.

(Second Embodiment)

While the above first embodiment has been described in connection with an example where the base station device notifies the control information containing information, which is necessary for error correction decoding of the predetermined number of interference signals, to the terminal devices multiplexed by SC corresponding to respective reception processing capabilities of the terminal devices, this second embodiment is described about a method of selecting, by the base station device, a signal to notify the RA information in order to indicate a decodable interference signal for the terminal device that is going to remove or suppress the interference signal. An example of configuration of the base station device in this embodiment is similar to that in the above embodiment, and is as per illustrated in FIGS. 2 and 3. An example of configuration of the terminal device in this embodiment is similar to that in the above embodiment, and is as per illustrated in FIGS. 4, 5, 6 and 7. A flowchart of reception processing is also similar to that in the above embodiment, and is as per illustrated in FIG. 8. In this embodiment, therefore, only different processes are described and description of similar processes is omitted.

The following description is made about a process of, in this embodiment, generating additional information contained in control information that is generated in the control information generation unit 109 of the base station device, i.e., generating information of the interference signal, the information being notified to the terminal devices multiplexed by SC. First, the radio resource control unit 108 determines, in the frequency scheduling, combination of the terminal devices multiplexed by SC and resource allocation. When the radio resource allocation determined by the radio resource control unit 108 is as per illustrated in FIG. 10, for example, the base station device selects an interference signal notified from the base station device to the terminal device in which the interference signal needs to be suppressed or removed. In other words, the interference signal for which decoding processing, such as CWIC, is needed is selected. Here, when the decoding processing, such as CWIC, is performed, transfer characteristics are better than those in the case of executing SLIC or MLD, for example, without decoding the interference signal. Therefore, the base station device preferably selects, as the interference signal for which the base station device notifies the RA information and MCS, an interference signal that does not provide high detection accuracy unless decoded.

Figure 10:
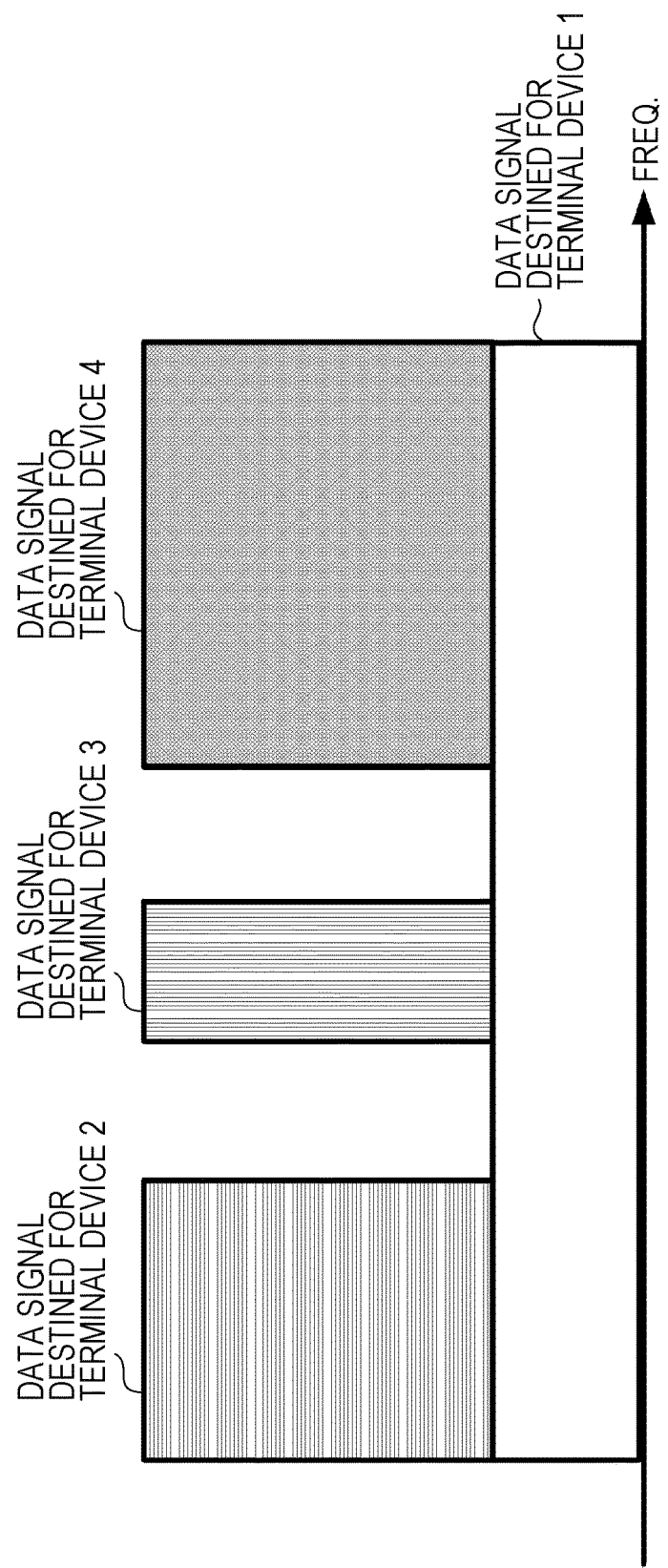
FIG. 10 illustrates an example of the frequency resource allocation to a plurality of terminal devices according to the present invention.
Figure 11:
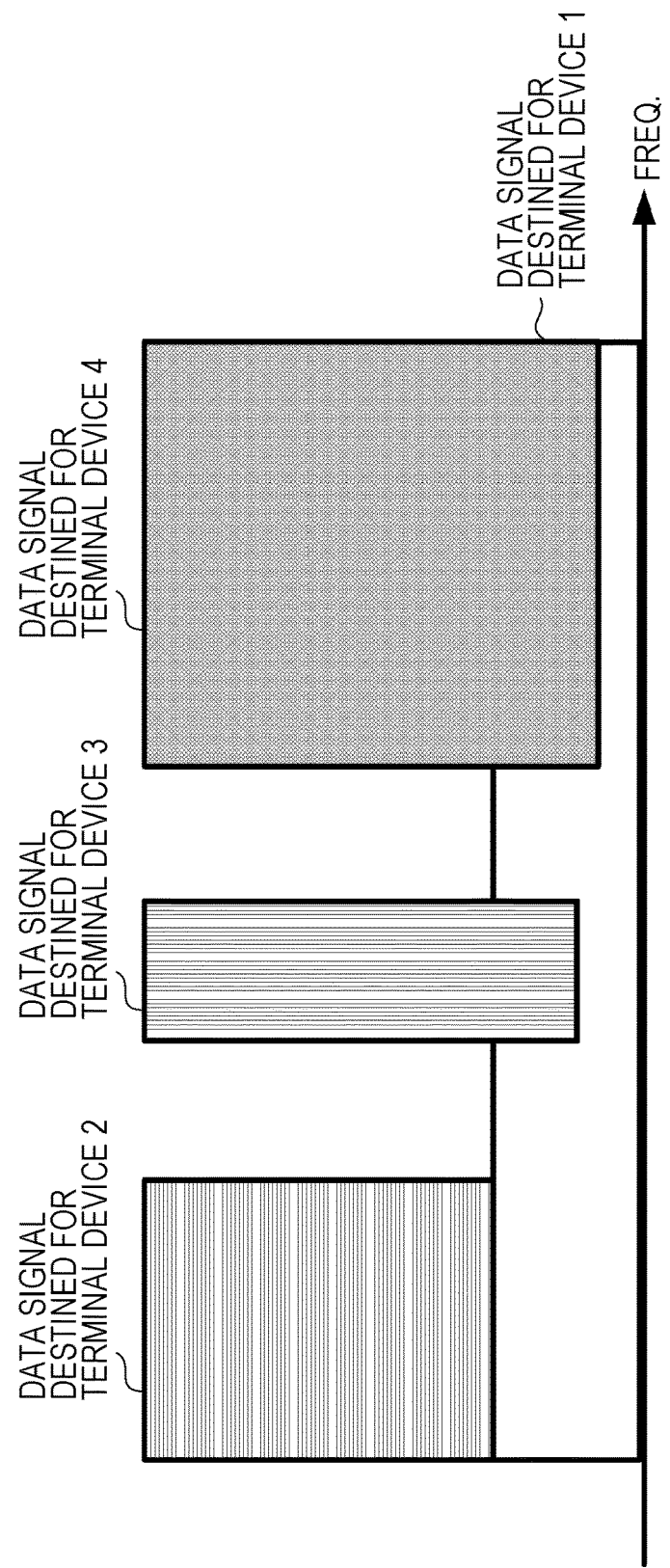
FIG. 11 illustrates an example of the frequency resource allocation to a plurality of terminal devices according to the present invention.

Because user interference occurs among the terminal devices multiplexed by SC, the control information generation unit 109 in the base station device generates control information containing the RA information and MCS of the interference signal that is multiplexed by SC in a maximum number of frequency resources among the frequency resources used to transmit the data signal destined for the terminal devices where the interference needs to be removed or suppressed (i.e., the RA information and MCS of the interference signal having a maximum overlap rate that is defined as a ratio of the number of frequency resources, which are multiplexed by SC with a particular interference signal, to a total number of frequency resources allocated to the terminal devices where the interference needs to be removed or suppressed). This is because the interference signal having a higher overlap rate is considered to be more influential upon transfer characteristics when the terminal device detects the desired signal. In the case of an example of the resource allocation such as illustrated in FIG. 10, the interference signal for which the RA information and MCS are transmitted to the terminal device 1 is given by the terminal device 4 that is multiplexed by SC in the maximum number of frequency resources. When the base station device notifies, to the terminal device 1, the control information containing the RA information and MCS, the interference signal to be notified may be determined depending on the transmission power of the data signal, which is multiplexed by SC, instead of depending on the overlap rate of the interference signal to be notified. In the case of an example of the resource allocation such as illustrated in FIG. 11, allocation of the transmission power is different for each combination of data signals that are multiplexed by SC. In FIG. 11, allocation of the transmission power is different among individual ranges of frequency resources, but total transmission power in each range of frequency resources is constant. However, the present invention is not limited to the illustrated example, and the present invention can be applied to even the case where total transmission power is different for each range of frequency resources. In the example of the resource allocation illustrated in FIG. 11, because the transmission power allocated to the data signal destined for the terminal device 2, which is regarded as the interference signal with respect to the terminal device 1, is lower than that allocated to the data signal destined for each of the terminal devices 3 and 4. It is hence thought that, in the terminal device 1, detection accuracy of the data signal destined for the terminal device 2 reduces and transfer characteristics obtained with SLIC or MLD deteriorate. Accordingly, the base station device notifies, to the terminal device 1, the control information containing the RA information and MCS of the interference signal to which lower transmission power is allocated.

When the base station device notifies the RA information and MCS of the interference signal to the terminal device 1, the base station device may notify the RA information and MCS of an interference signal having a maximum modulation order among a plurality of interference signals. This is because there is a possibility that, as in other examples, the detection accuracy of the interference signal reduces at a higher modulation order. Furthermore, when the base station device notifies the RA information and MCS of the interference signal to the terminal device 1, the base station device may notify the RA information and MCS of an interference signal having a minimum coding rate among a plurality of interference signals. This means that, because an effect of the error correction decoding is lower when the coding rate has a higher value, the interference signal having a lower coding rate is selected for which a higher effect of the error correction decoding is obtained. Moreover, when the base station device notifies the RA information and MCS of the interference signal to the terminal device 1, the base station device may select an interference signal for which the RA information and MCS are to be notified, depending on combination of the overlap rate, the allocated transmission power, the modulation order, and the coding rate. This embodiment has been described above in connection with the case of notifying information about one interference signal when the base station device notifies the RA information and MCS of the interference signal to the terminal device. However, the base station device may notify the RA information and MCS regarding the predetermined number of interference signals, or may notify the RA information and MCS regarding interference signals in number notified to the terminal device in advance.

According to this embodiment, as described above, since the base station device notifies, to the terminal devices multiplexed by SC, the RA information and MCS regarding the predetermined number of interference signals that are significantly influential upon the desired signal for the terminal device, an increase in amount of the control information can be suppressed.

(Third Embodiment)

While the above first and second embodiments have been described, respectively, in connection with a method of, by the base station device, notifying the control information containing information, which is necessary for error correction decoding of the predetermined number of interference signals, to the terminal devices multiplexed by SC corresponding to respective reception processing capabilities of the terminal devices, and with an example of the method of selecting the interference signal that is to be subjected to the error correction decoding, this third embodiment is described in connection with an example of changing control information, which is to be transmitted, depending on the reception processing capability of each of the terminal devices multiplexed by SC. An example of configuration of the base station device in this embodiment is similar to that in the above embodiments, and is as per illustrated in FIGS. 2 and 3. An example of configuration of the terminal device in this embodiment is similar to that in the above embodiments, and is as per illustrated in FIGS. 4, 5, 6 and 7. In this embodiment, therefore, only different processes are described and description of similar processes is omitted.

In this embodiment, the control information detection unit 107 of the base station device detects, for each of the connected terminal devices, information regarding whether the terminal device is able to apply CWIC or the like, which employs the result of the error correction decoding of the interference signal to remove interference, or whether the terminal device is able to apply SLIC, MLD or the like, which employs the demodulation result to remove or suppress interference without executing the error correction decoding of the interference signal. In other words, when a plurality of data signals are transferred in a state multiplexed by SC, the base station device receives, from each terminal device, information indicating whether the error correction decoding of the interference signal is executed in detection of the desired signal by the relevant terminal device. With respect to additional information contained in the control information generated by the control information generation unit 109, i.e., with respect to information of the interference signal notified to each of the terminal devices multiplexed by SC, the control information to be generated is changed in accordance with the information indicating whether the terminal device executes the error correction decoding of the interference signal. More specifically, the control information generation unit 109 generates control information containing the RA information and MCS of the interference signal for the terminal device that executes the error correction decoding of the interference signal, and generates a modulation order or MCS of the interference signal for the terminal device that does not execute the error correction decoding of the interference signal. Thus, the control information notified from the base station device to the terminal device is different in amount of information depending on whether the terminal device executes the error correction decoding of the interference signal. The control information notified to the terminal device executing the error correction decoding of the interference signal is generated by adding at least the RA information to the control information notified to the terminal device that does not execute the error correction decoding of the interference signal. Accordingly, the number of bits of the control information transmitted from the base station device is different depending on whether the terminal device executes the error correction decoding of the interference signal. Here, the number of bits of the control information may be changed only when transmitted in USS, or may be changed when transmitted in CSS or USS.

Figure 12:
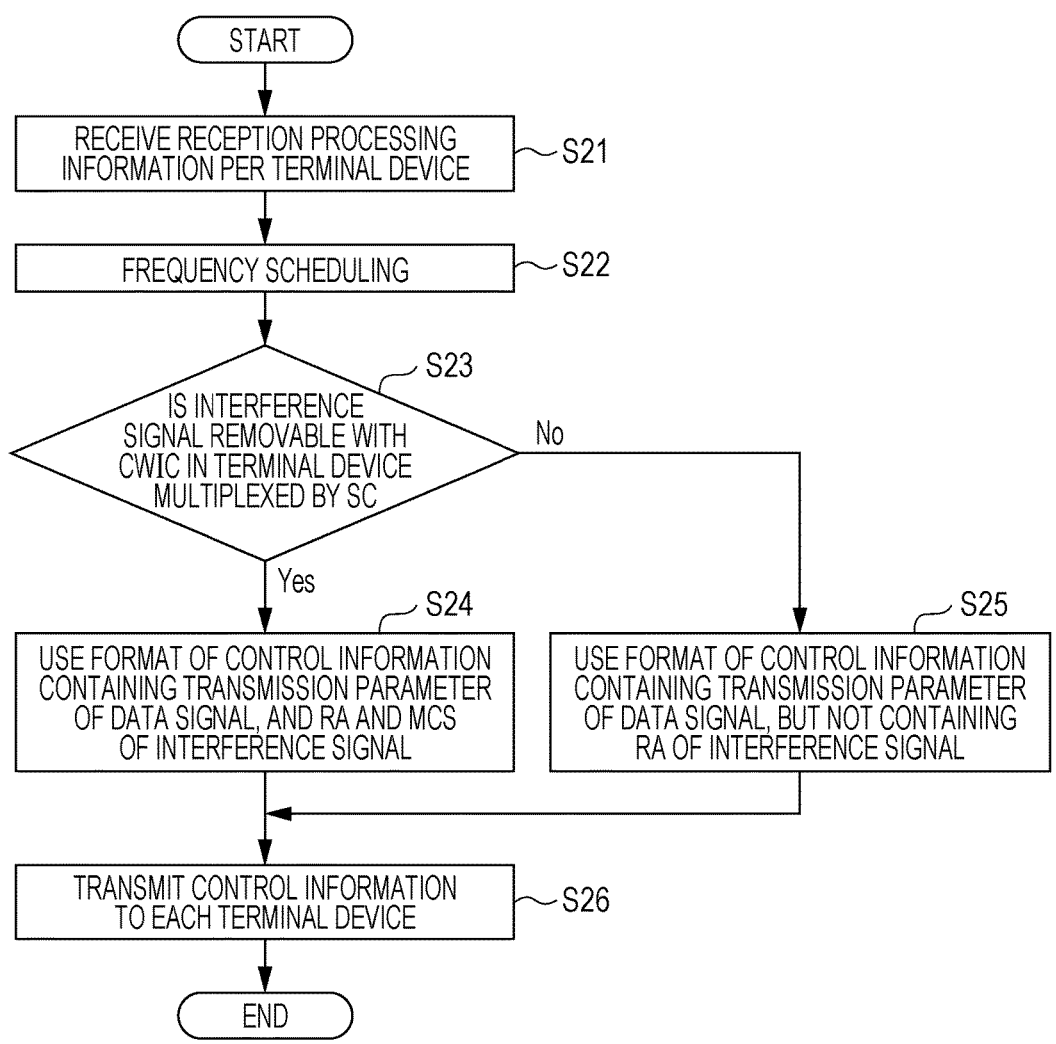
FIG. 12 illustrates an example of a flowchart for transmission of control information from the base station device according to the present invention.

FIG. 12 illustrates an example of a flowchart for transmission of control information from the base station device according to the present invention. First, the control information detection unit 107 receives the information indicating whether the terminal device executes the error correction decoding of the interference signal (S21). Then, the radio resource control unit 108 determines, as the frequency scheduling, allocation of frequency resources, which are used in the downlink data transfer, on the basis of CSI, etc. (S22). Here, the radio resource control unit 108 determines, in the frequency scheduling, not only combination of terminal devices for which OFDM transfer is performed without multiplexing by SC, and terminal devices that are multiplexed by SC, but also RA. The radio resource control unit 108 further determines, for the terminal devices multiplexed by SC, the transmission power, MCS, and the number of streams in MIMO transfer, which are allocated to each of those terminal devices. The base station device previously receives the reception processing capability from each terminal device, which needs to remove or suppress the interference signal for detection of the desired signal, among the terminal devices multiplexed by SC, and identifies, from received control information, information indicating whether CWIC for the error correction decoding of the interference signal can be executed with the received reception processing capability (S23). If the base station device determines that the terminal device is able to execute CWIC for the error correction decoding of the interference signal, it selects use of a format of the control information containing the transmission parameter of the desired signal, and the RA information and MCS of the interference signal (S24). On the other hand, if the base station device determines that the terminal device employs SLIC or MLD without executing the error correction decoding of the interference signal, it selects use of a format including the transmission parameter of the desired signal, but not including the RA information of the interference signal, i.e., a format including only the modulation order of the interference signal or MCS (S25). The transmission processing unit 103 transmits a signal generated in accordance with the format of the control information (S26). Subsequent processing of the base station device is similar to that in the above embodiments, and description of that processing is omitted.

In the terminal device, prior to receiving signals resulted from multiplexing a plurality of data signals by SC, the control information transmitting unit 208 previously notifies, as the reception processing capability, information indicating whether the error correction decoding of the interference signal is executed, the information being contained in the control information. Thus, because the reception processing capability is previously notified to the base station device, the control information detection unit 2044 executes blind decoding of the control information that is transmitted from the base station device corresponding to the reception processing capability. Here, in the terminal device, a candidate for the DCI format subjected to the blind decoding is determined depending on the preset transmission mode, and the number of bits of the DCI format is determined depending on a preset band width of the downlink and other settings of RRC. In this embodiment, because information of the interference signal, the information being needed when receiving the signals resulted from multiplexing a plurality of data signals by SC, is changed depending on the reception processing capability of the terminal device, the base station device generates the control information while changing the number of bits of the DCI format depending on the reception processing capability of the terminal device, and transmits the generated control information. Thus, the control information detection unit 2044 executes the blind decoding in the number of bits depending on the reception processing capability that has been notified to the base station device. In this connection, the number of bits of the DCI format subjected to the blind decoding may be changed depending on the reception processing capability only when the reception processing capability is notified in USS. Instead, in any case where the reception processing capability is notified in CSS or USS, the blind decoding may be executed while the number of bits is changed. Furthermore, the control information detection unit 2044 may change the number of bits of the DCI format, which is subjected to the blind decoding, depending on both the reception processing capability notified to the base station device and the transmission mode, which is set by the base station device and which is needed to receive the signals resulted from multiplexing a plurality of data signals by SC.

As an alternative, the control information detection unit 2044 may change the number of bits of the DCI format, which is subjected to the blind decoding, depending on both the reception processing capability notified to the base station device and setting that is made by control information in a higher layer, such as RRC signaling from the base station device, to receive the signals resulted from multiplexing a plurality of data signals by SC.

According to this embodiment, as described above, since the base station device changes the transmitted control information depending on the reception processing capability of each of the terminal devices multiplexed by SC, an increase in amount of the control information can be suppressed.

(Fourth Embodiment)

This fourth embodiment is described in connection with an example in which, when the base station device changes the transmitted control information depending on the reception processing capability of each of the terminal devices multiplexed by SC, amounts of the control information corresponding to the reception processing capabilities are held substantially the same. An example of configuration of the base station device in this embodiment is similar to that in the above embodiments, and is as per illustrated in FIGS. 2 and 3. An example of configuration of the terminal device in this embodiment is similar to that in the above embodiments, and is as per illustrated in FIGS. 4, 5, 6 and 7. A flowchart for transmission of the control information from the base station device is also similar to that in the above embodiment, and is as per illustrated in FIG. 12. In this embodiment, therefore, only different processes are described and description of similar processes is omitted.

In this embodiment, the control information detection unit 107 of the base station device detects, for each of the connected terminal devices, information regarding whether the terminal device is able to apply CWIC or the like, which employs the result of the error correction decoding of the interference signal to remove interference, or whether the terminal device is able to apply SLIC, MLD or the like, which employs the demodulation result to remove or suppress interference without executing the error correction decoding of the interference signal. In other words, when a plurality of data signals are transferred in a state multiplexed by SC, the base station device receives, from each terminal device, information indicating whether the error correction decoding of the interference signal is executed in detection of the desired signal by the relevant terminal device. With respect to additional information contained in the control information generated by the control information generation unit 109, i.e., with respect to information of the interference signal notified to each of the terminal devices multiplexed by SC, the control information to be generated is changed in accordance with the information indicating whether the terminal device executes the error correction decoding of the interference signal. More specifically, the control information generation unit 109 generates control information containing the RA information and MCS of the interference signal for the terminal device that executes the error correction decoding of the interference signal, and generates a modulation order or MCS of the interference signal for the terminal device that does not execute the error correction decoding of the interference signal. Thus, the control information notified from the base station device to the terminal device is different in amount of information depending on whether the terminal device executes the error correction decoding of the interference signal. Accordingly, when the terminal device executes the blind decoding of the control information transmitted from the base station device, the terminal device is needed to make determination about a point that the control information is transmitted in the different number of bits depending on the reception processing capability. Hence the blind decoding is complicated. To avoid such complication, in this embodiment, the control information notified to the terminal device executing the error correction decoding of the interference signal is given in form containing the RA information and MCS of the interference signal as in the above embodiments, and the control information notified to the terminal device not executing the error correction decoding of the interference signal is given as the modulation order in units of sub-band, thereby making the respective numbers of bits of the former and latter control information substantially equal to each other.

FIG. 13 illustrates an example of the frequency resource allocation to a plurality of terminal devices according to the present invention. FIG. 13 illustrates an example of the frequency resource allocation in which there are sub-bands F01 to F08 and downlink data is transferred to terminal devices 1 to 5. Because a data signal destined for the terminal device 1 is multiplexed by SC with data signals destined for the terminal device 2 and the terminal device 3, those interference signals need to be removed or suppressed. When the terminal device 1 executes the error correction decoding of the interference signal, the base station device generates, in the control information generation unit 109, the control information containing the RA information and MCS of the interference signal. On the other hand, when the terminal device 1 does not execute the error correction decoding of the interference signal, the base station device generates, in the control information generation unit 109, the control information containing the modulation order per sub-band of the interference signal. In order to notify the modulation order per sub-band, the base station device may prepare 1 bit, for example, to notify QPSK or 16QAM. In such a case, assuming that the number of sub-bands of a system band is N, notification may be performed in N bits, while the prepared 1 bit indicates QPSK with a value of 0 and 16QAM with a value of 1. As an alternative, 2 bits may be prepared to notify the modulation order per sub-band such that QPSK, 16QAM, 64QAM, and the absence of multiplexed signals can be indicated, and notification may be performed in 2N bits. Each sub-band may be constituted by a plurality of resource blocks, and one sub-band may be selected from 1 to 16 resource blocks, for example.

An example of information of the interference signal generated by the control information generation unit 109 in this embodiment is described. When the system band has 100 resource blocks and successive resource blocks within the system band are used in that case, the RA information has 13 bits, and MCS of the interference signal, which is set only one in the system band, has 5 bits. Therefore, the control information generation unit 109 adds 18 bits of information regarding the interference signal to the control information transmitted to the terminal device that executes the error correction decoding of the interference signal. On the other hand, when each sub-band is constituted by 6 resource blocks, 17 bits are needed to notify the modulation order because the modulation order is set in units of sub-band. Thus, the control information generation unit 109 can make the number of bits of the control information transmitted to the terminal device, which does not execute the error correction decoding of the interference signal, and the number of bits of the control information transmitted to the terminal device, which executes the error correction decoding of the interference signal, equal to each other by adding a padding bit of 1 bit to the former control information.

According to this embodiment, as described above, when the base station device changes the transmitted control information depending on the reception processing capability of each of the terminal devices multiplexed by SC, the amounts of the control information corresponding to the reception processing capabilities can be held substantially the same, and complication of the blind decoding can be reduced.

(Fifth Embodiment)

This fifth embodiment is described in connection with an example in which, when the base station device changes the transmitted control information depending on the reception processing capability of each of the terminal devices multiplexed by SC, amounts of the control information corresponding to the reception processing capabilities are held substantially the same. An example of configuration of the base station device in this embodiment is similar to that in the above embodiments, and is as per illustrated in FIGS. 2 and 3. An example of configuration of the terminal device in this embodiment is similar to that in the above embodiments, and is as per illustrated in FIGS. 4, 5, 6 and 7. A flowchart for transmission of the control information from the base station device is also similar to that in the above embodiments, and is as per illustrated in FIG. 12. In this embodiment, therefore, only different processes are described and description of similar processes is omitted.

In this embodiment, the control information detection unit 107 of the base station device detects, for each of the connected terminal devices, information regarding whether the terminal device is able to apply CWIC or the like, which employs the result of the error correction decoding of the interference signal to remove interference, or whether the terminal device is able to apply SLIC, MLD or the like, which employs the demodulation result to remove or suppress interference without executing the error correction decoding of the interference signal. In other words, when a plurality of data signals are transferred in a state multiplexed by SC, the base station device receives, from each terminal device, information indicating whether the error correction decoding of the interference signal is executed in detection of the desired signal by the relevant terminal device. With respect to additional information contained in the control information generated by the control information generation unit 109, i.e., with respect to information of the interference signal notified to each of the terminal devices multiplexed by SC, the control information to be generated is changed in accordance with the information indicating whether the terminal device executes the error correction decoding of the interference signal. More specifically, the control information generation unit 109 generates control information containing the RA information and MCS of the interference signal for the terminal device that executes the error correction decoding of the interference signal, and generates a modulation order or MCS of the interference signal for the terminal device that does not execute the error correction decoding of the interference signal. Thus, the control information notified from the base station device to the terminal device is different in amount of information depending on whether the terminal device executes the error correction decoding of the interference signal. Accordingly, when the terminal device executes the blind decoding of the control information transmitted from the base station device, the terminal device is needed to make determination about a point that the control information is transmitted in the different number of bits depending on the reception processing capability. Hence the blind decoding is complicated. To avoid such complication, in this embodiment, the control information notified to the terminal device executing the error correction decoding of the interference signal is given in form containing the RA information and MCS of the interference signal as in the above embodiments, and the control information notified to the terminal device not executing the error correction decoding of the interference signal is given as the modulation order and the transmission power (power ratio) in units of sub-band, thereby making the respective numbers of bits of the former and latter control information substantially equal to each other.

In the example of FIG. 13, because the data signal destined for the terminal device 1 is multiplexed by SC with data signals destined for the terminal device 2 and the terminal device 3, those interference signals need to be removed or suppressed. When the terminal device 1 executes the error correction decoding of the interference signal, the base station device generates, in the control information generation unit 109, the control information containing the RA information and MCS of the interference signal. On the other hand, when the terminal device 1 does not execute the error correction decoding of the interference signal, the base station device generates, in the control information generation unit 109, the control information containing the modulation order and the transmission power (power ratio) per sub-band of the interference signal. In an example, a method of notifying the modulation order per sub-band is similar to that described in the above embodiment, and the transmission power (power ratio) per sub-band is notified as follows. When the transmission power of the desired signal is notified in 5 bits, any value of $P1=\{0.0, 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1.0\}$ may be used. $P1=1.0$ represents the case where there are no signals multiplexed by SC, and $P1=0.0$ represents the case where the desired signal is not allocated. When P1 is equal to or less than 0.5, this represents the case where it is essential to remove the interference caused by the interference signal. However, the notification of the transmission power is not limited to above example, and may be performed by another method.

According to this embodiment, as described above, when the base station device changes the transmitted control information depending on the reception processing capability of each of the terminal devices multiplexed by SC, the amounts of the control information corresponding to the reception processing capabilities can be held substantially the same, and complication of the blind decoding can be reduced.

Programs operated to run on the base station device and the terminal device according to the present invention are programs controlling a CPU (i.e., programs causing a computer to operate) such that the functions of the above embodiments according to the present invention are realized. Information handled in those devices is temporarily accumulated in a RAM when processed, and then stored in any of various ROM's and HDD's. The stored program is read by the CPU, as required, for correction or writing. A recording medium storing the programs may be any of semiconductor media (such as ROM and a nonvolatile memory card), optical recording media (such as DVD, MO, MD, CD and BD), magnetic recording media (such as a magnetic tape and a flexible disk), etc. The functions of the above embodiments according to the present invention are realized not only by causing the loaded program to run, but also by executing processing in cooperation with an operating system, another application program, or the like in accordance with instructions of the loaded program.

When the programs are distributed to the market, they may be distributed in a state stored in a portable recording medium, or may be transferred to a server computer connected via a network such as the Internet. In such a case, a storage device of the server computer is also included in the present invention. Each of the base station device and the terminal device in the above embodiments may be partly or entirely realized in the form of an LSI, which is a typical integrated circuit. The functional blocks of the base station device and the terminal device may be individually realized in the form of separate chips, or they may be partly or entirely integrated into one or more chips. The integrated circuit is not limited to the LSI, and it may be realized using a dedicated circuit or a universal processor. When the functional blocks are realized in the form of an integrated circuit, an integrated-circuit control unit is added to control the functional blocks in the integrated circuit.

The integrated circuit is not limited to the LSI, and it may be realized using a dedicated circuit or a universal processor. Furthermore, if a technique for realizing an integrated circuit instead of the LSI technique will be developed with the progress of the semiconductor technology, the integrated circuit manufactured with the developed technique can also be used.

The invention of this application is not limited to the above embodiments. As a matter of course, the terminal device according to the invention of this application can be applied to not only a mobile device, but also to stationary or immobile electronic devices installed indoor and outdoor, such as AV devices, kitchen devices, cleaners, washing machines, air conditioners, office equipment, automatic vending machines, and other electronic living equipment.

The embodiments of the present invention have been described in detail above with reference to the drawings, practical configurations are not limited to the ones described in the embodiments, and various modifications in design, etc. are also included in the present invention insofar as not departing from the gist of the present invention. Furthermore, the present invention can be variously modified within the scope defined in Claims, and embodiments resulting from combining technical means disclosed in the above different embodiments as appropriate are also included in the present invention. Moreover, the present invention further includes configurations resulting from replacing elements with each other, which are set forth in the above embodiments and which have similar effects.

This International Application is based on and claims priority of Japanese Patent Application No. 2015-085541 filed on Apr. 20, 2015, and the entire contents of Japanese Patent Application No. 2015-085541 are incorporated herein by reference.

REFERENCE SIGNS LIST

10 . . . base station device
21 to 25 . . . terminal devices
101 . . . transmitted signal generation unit
102 . . . IFFT unit
103 . . . transmission processing unit
104 . . . transmit antenna
105 . . . receive antenna
106 . . . radio receiving unit
107 . . . control information detection unit
108 . . . radio resource control unit
109 . . . control information generation unit
1011-1 to 1011-2 . . . error correction coding units
1012-1 to 1012-2 . . . modulators
1013-1 to 1013-2 . . . transmission power control units
1014 . . . signal multiplexing unit
1015 . . . reference signal multiplexing unit
1016 . . . reference signal generation unit
1017 . . . control signal multiplexing unit
1018 . . . transmitted signal allocation unit
201 . . . receive antenna
202 . . . reception processing unit
203 . . . FFT unit
204 . . . signal separation unit
205 . . . signal detection unit
206 . . . channel estimation unit
207 . . . control information generation unit
208 . . . control information transmitting unit
209 . . . transmit antenna
2041 . . . reference signal separation unit
2042 . . . control information separation unit
2043 . . . allocation signal extraction unit
2044 . . . control information detection unit
2045 . . . interference signal identification unit
2050 . . . interference signal demodulation unit
2051 . . . interference signal decoding unit
2052 . . . interference signal regeneration unit
2053 . . . interference removing unit
2054 . . . desired signal detection unit
2054-1 . . . channel compensation unit
2054-2 . . . demodulator
2054-3 . . . decoder

The invention claimed is:

1. A base station device for communicating with a terminal device, the base station device comprising:
radio resource control (RRC) processing circuitry configured to transmit RRC configuration information to the terminal device,
transmission processing circuitry configured to transmit downlink control information (DCI) on a physical downlink control channel (PDCCH) and transmit downlink data on a physical downlink shared channel (PDSCH), and
transmission signal generation circuitry configured to take encoded bits in the downlink data as input and produce modulation symbols, wherein
in a case that the RRC configuration information includes first information for superposition coded modulation and one of a first plurality of DCI formats is used, the DCI includes second information indicating that an interference with the modulation symbols is included and indicating transmission power ratio,
in a case that the RRC configuration information includes the first information and one of a second plurality of DCI formats is used, the DCI does not include the second information,
in a case that the second information indicates a first value, the modulation symbols are produced without including an interference signal, and
in a case that the second information indicates a value other than the first value and the value other than the first value indicates that the transmission power ratio is less than 0.5, the modulation symbols are produced with including the interference signal.

2. The base station device according to claim 1, wherein number of bits of the second information is determined depending on one of the first plurality of DCI formats.

3. The base station device according to claim 1, wherein the transmission processing circuitry transmits the DCI in a user-specific search space.

4. The base station device according to claim 1, wherein the transmission power ratio is less than 0.5.

5. A terminal device for communicating with a base station device, the terminal device comprising:
- radio resource control (RRC) processing circuitry configured to receive RRC configuration information from the base station device,
- reception processing circuitry configured to receive downlink control information (DCI) on a physical downlink control channel (PDCCH), and receive downlink data on a physical downlink shared channel (PDSCH), the downlink data including encoded bits which are taken as input for producing modulation symbols, wherein
- in a case that the RRC configuration information includes first information for superposition coded modulation and one of a first plurality of DCI formats is used, the DCI includes second information indicating that an interference with the modulation symbols is included and indicating transmission power ratio,
- in a case that the RRC configuration information includes the first information and one of a second plurality of DCI formats is used, the DCI does not include the second information,
- in a case that the second information indicates a first value, the modulation symbols are produced without including an interference signal, and
- in a case that the second information indicates a value other than the first value and the value other than the first value indicates that the transmission power ratio is less than 0.5, the modulation symbols are produced with including the interference signal.

6. The terminal device according to claim 5, wherein number of bits of the second information is determined depending on one of the first plurality of DCI formats.

7. The terminal device according to claim 5, wherein the DCI is included in a user-specific search space.

8. The terminal device according to claim 5, wherein the transmission power ratio is less than 0.5.

* * * * *